(12) United States Patent
Dairoku et al.

(10) Patent No.: US 9,175,143 B2
(45) Date of Patent: Nov. 3, 2015

(54) METHOD FOR PRODUCING PARTICULATE WATER-ABSORBENT RESIN

(75) Inventors: Yorimichi Dairoku, Himeji (JP); Toshihiro Takaai, Himeji (JP); Shinichi Fujino, Himeji (JP); Satoshi Matsumoto, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 70 days.

(21) Appl. No.: 13/258,645

(22) PCT Filed: Mar. 31, 2010

(86) PCT No.: PCT/JP2010/055930
§ 371 (c)(1),
(2), (4) Date: Sep. 22, 2011

(87) PCT Pub. No.: WO2010/114058
PCT Pub. Date: Oct. 7, 2010

(65) Prior Publication Data
US 2012/0016084 A1    Jan. 19, 2012

(30) Foreign Application Priority Data
Mar. 31, 2009  (JP) ................ 2009-084955

(51) Int. Cl.
C08F 20/06 (2006.01)
C08J 3/12 (2006.01)
C08J 3/24 (2006.01)
C08F 220/06 (2006.01)

(52) U.S. Cl.
CPC . *C08J 3/12* (2013.01); *C08F 20/06* (2013.01); *C08F 220/06* (2013.01); *C08J 3/245* (2013.01); *C08J 2333/02* (2013.01)

(58) Field of Classification Search
CPC ...... C08F 20/06; C08F 120/06; C08F 220/06; C08J 3/12; C08J 3/245; C08J 2333/02
USPC ..................... 525/329.7; 526/317.1
See application file for complete search history.

(56) References Cited

U.S. PATENT DOCUMENTS

| | | | |
|---|---|---|---|
| 4,734,478 A | 3/1988 | Tsubakimoto et al. | |
| 4,973,632 A | 11/1990 | Nagasuna et al. | |
| 5,244,735 A | 9/1993 | Kimura et al. | |
| 5,250,640 A | 10/1993 | Irie et al. | |
| 5,275,773 A | 1/1994 | Irie et al. | |
| 5,342,899 A | 8/1994 | Graham et al. | |
| 5,419,956 A | 5/1995 | Roe | |
| 5,455,284 A | 10/1995 | Dahmen et al. | |
| 6,133,193 A | 10/2000 | Kajikawa et al. | |
| 6,164,455 A | 12/2000 | Kakita et al. | |
| 6,228,930 B1 | 5/2001 | Dairoku et al. | |
| 6,291,636 B1* | 9/2001 | Miyake et al. | ............ 528/502 C |
| 6,576,713 B2 | 6/2003 | Ishizaki et al. | |
| 6,817,557 B2 | 11/2004 | Kakita et al. | |
| 7,378,453 B2 | 5/2008 | Nogi et al. | |
| 7,473,470 B2 | 1/2009 | Ishizaki et al. | |
| 2001/0025093 A1* | 9/2001 | Ishizaki et al. | ................ 526/210 |
| 2003/0020199 A1 | 1/2003 | Kajikawa et al. | |
| 2004/0181031 A1* | 9/2004 | Nogi et al. | ..................... 528/480 |
| 2005/0113252 A1* | 5/2005 | Miyake et al. | ................. 502/402 |
| 2006/0204755 A1 | 9/2006 | Torii et al. | |
| 2007/0015860 A1 | 1/2007 | Frank | |
| 2007/0066167 A1 | 3/2007 | Wada et al. | |
| 2008/0202987 A1 | 8/2008 | Weismantel et al. | |
| 2008/0306209 A1 | 12/2008 | Stueven et al. | |
| 2009/0194462 A1 | 8/2009 | Stueven et al. | |
| 2009/0261023 A1 | 10/2009 | Stueven et al. | |
| 2009/0266747 A1 | 10/2009 | Stueven et al. | |
| 2010/0101982 A1 | 4/2010 | Konishi et al. | |
| 2010/0119312 A1* | 5/2010 | Nagashima et al. | ............ 406/46 |
| 2010/0323885 A1 | 12/2010 | Herfert et al. | |
| 2012/0037847 A1* | 2/2012 | Torii et al. | ..................... 252/194 |

FOREIGN PATENT DOCUMENTS

| | | |
|---|---|---|
| CN | 1464826 | 12/2003 |
| CN | 1611529 | 5/2005 |
| EP | 0 450 922 | 10/1991 |
| JP | 11-292919 | 10/1999 |
| JP | 2004-345804 | 12/2001 |
| JP | 2002-121291 | 4/2002 |
| JP | 2003-82107 | 3/2003 |
| JP | 2005-097604 | 4/2005 |
| JP | 2008-260636 | 10/2008 |
| WO | WO 2008/114848 A1 * | 9/2008 |
| WO | WO 2008/120742 A1 * | 10/2008 |
| WO | 2009/113679 | 9/2009 |

* cited by examiner

*Primary Examiner* — Roberto Rabago
(74) *Attorney, Agent, or Firm* — Cesari and McKenna, LLP

(57) ABSTRACT

A production of a water-absorbent resin by which a particle diameter of the water-absorbent resin can be controlled simply and conveniently, and a content of fine powder can be decreased, without necessity of change of raw materials or expensive facility investment is to be provided. The method is a continuous production method of a polyacrylic acid (salt)-based water-absorbent resin, comprising a polymerization step of an aqueous solution containing acrylic acid (salt), a drying step of the resultant hydrogel-like polymer, a pulverization step of the dried substance, a classification step of the pulverized substance, and optionally a surface cross-linking step of the classified substance, wherein (a) the drying step and the pulverization step are connected via a storage step and a transportation step; and (b) a time of holding the dried substance from a time of completing the drying step to a time of starting the pulverization step is set at 3 minutes or longer.

16 Claims, 11 Drawing Sheets

METHOD FOR PRODUCING PARTICULATE WATER-ABSORBENT RESIN

CROSS REFERENCE TO RELATED APPLICATIONS

This application is a National Stage of International Application No. PCT/JP2010/055930, filed on Mar. 31, 2010, which claims priority to Japanese Application No. 2009-084955 filed Mar. 31, 2009. The content of the prior applications are incorporated herein by reference in their entirety.

TECHNICAL FIELD

The present invention relates to a method for producing a particulate water-absorbent resin. More specifically, the present invention relates to a method for producing a particulate water-absorbent resin, which little generates fine particles (fine powder), is capable of suppressing also generation of coarse particles, and provides particles within a desired particle diameter range in good yield.

BACKGROUND ART

A water-absorbent resin has been widely utilized in various applications such as hygiene articles including disposable diapers, sanitary napkins, incontinent pads for adults and the like; and a water-retaining agent for soil, due to its absorbing property of such a large quantity of aqueous liquid as several times to several-hundred times own weight, and has been produced and consumed in a large quantity. Such a water-absorbent resin (it may also be called a high water-absorbent resin or a water-absorbing polymer) is described, for example, in Japanese Industrial Standard (JIS) K7223-1996, as well as introduced in many commercial reference books.

Although a sheet, a film, a fiber, gel, emulsion or the like have also been known as a form of the water-absorbent resin, a particulate is general, and it is provided in a powder state by obtaining a hydrogel-like polymer by polymerization of a hydrophilic unsaturated monomer, and drying it. The hydrogel-like polymer is mostly obtained as a bulk or aggregated substance of hydrogel particles, which is usually dried so as to give a solid content of about 95% by weight, and then pulverized to a particle with a desired size using a pulverization machine. Because the pulverized substance generally has a certain particle size distribution, however, particles having a particle diameter outside a desired range also generate. Therefore, by sieve classification of this pulverized substance after drying using a classification machine, particles having a size within a desired particle diameter range are prepared. As a result, a particulate water-absorbent resin is obtained. As the particulate water-absorbent resin to be used in hygiene articles, although different depending on intended applications, particles having a particle diameter in the range of usually 106 m or larger, still more 150 μm or larger and below 850 μm, as a major component, are preferably used. On the other hand, fine powder with a particle diameter below 106 μm, still mote below 150 μm, would blow up as powder dust and deteriorate work environment, in fabrication to hygiene articles, as well as causes deterioration of liquid permeability of the water-absorbent resin, and thus it is desirable that amount of fine powder contained in the water-absorbent resin is as low as possible. In addition, particles having a particle diameter of 850 μm or larger would provide convex-concave feeling at apart contacting with a skin, or decrease absorption rate, when used as a material of a hygiene article, and thus it is desirable that particles having a particle diameter of 850 μm or larger contained in the water-absorbent resin, are as less as possible, and usually particles having a particle diameter of 850 μm or larger are classified by sieve classification and then re-pulverized. Load of the pulverization machine or generation of fine powder, in this case, has also been a problem (refer to PATENT LITERATURES 1 to 4).

As described above, a water-absorbent resin is preferably in a form of particles having the upper limit and the lower limit of particle diameter controlled, and as a control method of such a particulate water-absorbent resin, there have been known a method for controlling particle diameter in a polymerization step such as reversed phase suspension polymerization (refer to PATENT LITERATURES 5 and 6); a method for controlling in a fine granulation step of a hydrogel-like polymer (refer to PATENT LITERATURES 7 and 8); a method for controlling in a pulverization step of a dried substance (refer to PATENT LITERATURES 9 and 10); a method for controlling in a classification step (refer to PATENT LITERATURES 11 to 16); a method for granulating in surface cross-linking (refer to PATENT LITERATURE 17); a method for removing fine powder with air flow in a cooling step after surface cross-linking (refer to PATENT LITERATURE 18); a method for making a large particle by adhering particles themselves after surface cross-linking (refer to PATENT LITERATURES 18 to 22), or the like.

However, control of a particle diameter in polymerization disclosed in PATENT LITERATURES 5 and 6 has limitation, as well as had still more difficulty in controlling a particle diameter in aqueous solution polymerization, unlike in the case of reversed phase suspension polymerization where polymerization is performed in a particle state.

In addition, also in a method disclosed in PATENT LITERATURES 7 to 10, there is limitation in controlling a particle diameter, and effect thereby is insufficient only by improvement of a pulverization apparatus, which thus requires search for conditions of a dried substance which permits efficient pulverization. A method for pulverizing a water-absorbent resin with high water content generally requires higher load on a pulverization machine, as compared with pulverization of a water-absorbent resin with low water content, and still more limits a pulverization method and a pulverization machine which can be used. As disclosed in PATENT LITERATURE 10, in a method for performing forced cooling, it is possible to suppress generation of fine powder in pulverization or particles which cannot be pulverized to a desired particle diameter, even by passing through a pulverization machine, as long as temperature of a dried substance is near room temperature. There, however, is a problem of requiring large scale facility, in using cool air or increasing air amount, due to inferior cooling efficiency in performing further cooling from 50° C. using air at room temperature.

Further, although removal of fine powder by classification disclosed in PATENT LITERATURES 11 to 16 and PATENT LITERATURE 18 enabled to remove fine powder, in some cases, it required not only disposal or reuse (recycle) of a large quantity of fine powder, but also classification operation for a long period for removing only fine powder completely. In addition, a granulation method disclosed in PATENT LITERATURES 17 to 22 showed a case where fine powder was reproduced in use or during transportation, caused by weak granulation strength, or absorption property was decreased, caused by use of a binder or the like in granulation.

Still more, a recycling method for a water-absorbent resin fine powder in a producing step described in PATENT LITERATURES 23 to 26 has a problem of requiring facility to recover and process fine powder, as well as requiring operation cost therefor, and thus it is necessary to reduce generation amount itself of fine powder. In addition, a method for recycling fine powder to a monomer of a polymerization step or a hydrogel-like polymer, described in PATENT LITERATURES 24 to 26 and the like, generated, in some cases, a problem of polymerization inhibition caused by fine powder.

PRIOR PUBLICATION

Patent Literature

PATENT LITERATURE 1: U.S. Pat. No. 5,419,956
PATENT LITERATURE 2: US-A-2006-204755
PATENT LITERATURE 3: US-A-2007-066167
PATENT LITERATURE 4: U.S. Pat. No. 7,473,470
PATENT LITERATURE 5: U.S. Pat. No. 5,244,735
PATENT LITERATURE 6: U.S. Pat. No. 4,973,632
PATENT LITERATURE 7: U.S. Pat. No. 5,250,640
PATENT LITERATURE 8: U.S. Pat. No. 5,275,773
PATENT LITERATURE 9: U.S. Pat. No. 6,576,713
PATENT LITERATURE 10: U.S. Pat. No. 6,817,557
PATENT LITERATURE 11: U.S. Pat. No. 6,164,455
PATENT LITERATURE 12: WO 2006/074816 A
PATENT LITERATURE 13: WO 2008/037672 A
PATENT LITERATURE 14: WO 2008/037673 A
PATENT LITERATURE 15: WO 2008/037675 A
PATENT LITERATURE 16: WO 2008/123477 A
PATENT LITERATURE 17: EP Patent No. 0450922
PATENT LITERATURE 18: U.S. Pat. No. 7,378,453
PATENT LITERATURE 19: WO 2008/110524 A
PATENT LITERATURE 20: U.S. Pat. No. 4,734,478
PATENT LITERATURE 21: US-A-2007-015860
PATENT LITERATURE 22: U.S. Pat. No. 6,133,193
PATENT LITERATURE 23: U.S. Pat. No. 6,228,930
PATENT LITERATURE 24: U.S. Pat. No. 5,455,284
PATENT LITERATURE 25: U.S. Pat. No. 5,342,899
PATENT LITERATURE 26: US-A-2008-0306209

DISCLOSURE OF INVENTION

As described above, as for control of particle diameter of a particulate water-absorbent resin, many methods have been proposed in each step subsequent to a polymerization step, however, any of them accompanies with not only a problem of increase in cost or decrease in productivity but also a problem of decrease in absorbing property or regeneration of fine powder in granulation or the like.

Accordingly, the present invention has been proposed in view of the above conventional problems, and it is an object of the present invention to provide a method for producing a water-absorbent resin, which is capable of essentially controlling a particle diameter of a water-absorbent resin more conveniently, without decrease in property.

The present inventors have intensively studied about a way to attain the above object and noticed for the first time "time from a time of completing a drying step to a time of starting a pulverization step", which has never been noticed conventionally in the PATENT LITERATURES 1 to 26 and the like. In addition, we have discovered that by controlling the time a time of completing a drying step to a time of starting a pulverization step to a certain period or longer, generation of fine powder can be suppressed and pulverization can be performed efficiently, and have thus completed the present invention.

That is, to solve the above problems, the present invention provides a continuous production method of a polyacrylic acid (salt)-based water-absorbent resin, comprising a polymerization step of an aqueous solution containing acrylic acid (salt), a drying step of the resultant hydrogel-like polymer, a pulverization step of the dried substance, a classification step of the pulverized substance, and optionally a surface cross-linking step of the classified substance, wherein (a) the drying step and the pulverization step are connected via a storage step and a transportation step; and (b) a time of holding the dried substance from a time of completing the drying step to a time of starting the pulverization step is set at 3 minutes or longer.

According to the present invention, in the method for producing the water-absorbent resin which comprises a polymerization step, a drying step, a pulverization step, a classification step, and a surface cross-linking step, a particle diameter can be controlled simply and conveniently, while relatively suppressing increase in cost or decrease in productivity.

Figure 1:
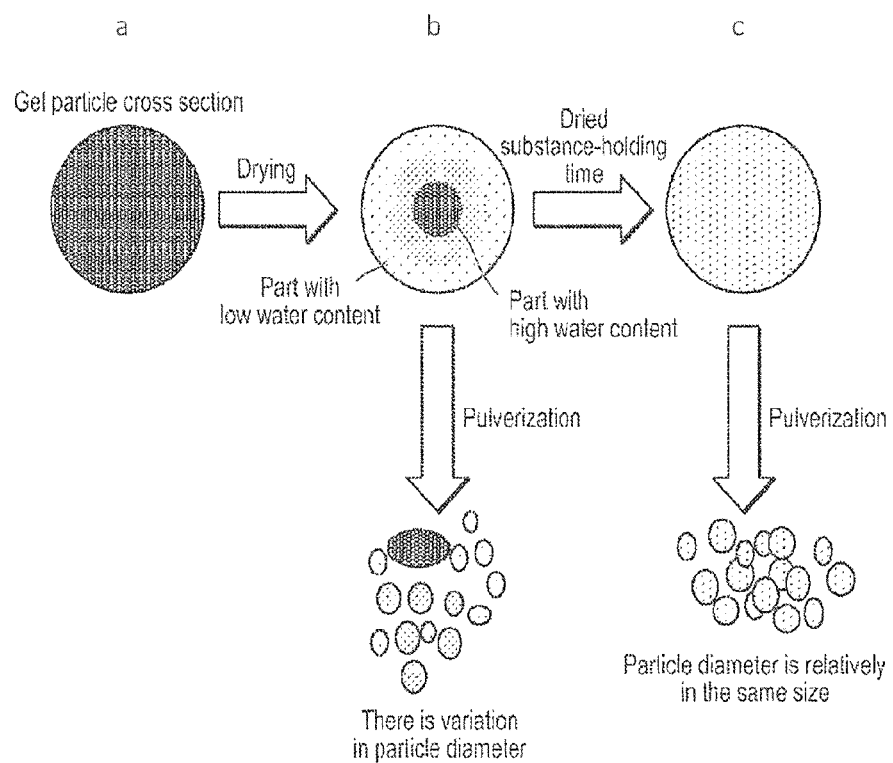
FIG. 1 is a schematic drawing showing estimated mechanism of the present invention.

It should be noted that FIG. 10 to FIG. 13 show a process having different dried substance-holding times or dry substance holding methods depending on each particle size.

MODE FOR CARRYING OUT THE INVENTION

The present invention provides a continuous production method of a polyacrylic acid (salt)-based water-absorbent resin, comprising a polymerization step of an aqueous solution containing acrylic acid (salt), a drying step of the resultant hydrogel-like polymer (hereafter may be referred to also as "hydrogel"), a pulverization step of the dried substance, a classification step of the pulverized substance, and optionally a surface cross-linking step of the classified substance, wherein (a) the drying step and the pulverization step are connected via a storage step and a transportation step; and (b) a time of holding the dried substance from a time of completing the drying step to a time of starting the pulverization step is set at 3 minutes or longer.

Explanation will be given below in detail on the method for producing the particulate water-absorbent resin relevant to the embodiment of the present invention. A scope of the present invention, however, should not be restricted to these explanations, and methods other than the following exemplification also may be executed by modification, as appropriate, unless a scope of the present invention is not impaired. Specifically, the present invention is performed in accordance with the production processes as shown in the flow charts of FIGS. 9 to 13, or the following each embodiment. The present invention, however, should not be limited to the production processes or the following each embodiment, and various changes are possible within a range defined in claims, as well as embodiment obtained by combining, as appropriate, technical means each disclosed in different embodiments may also be encompassed within a technical scope of the present invention. It should be noted that FIGS. 9 to 13 are a schematic flow diagram showing various production processes relevant to the embodiment of the present invention. The drawings, however, are an example of the production processes arranged with the following each step.

In addition, a typical method for producing of a particulate water-absorbent resin is described in the following [2] "Production method for particulate water-absorbent resin", and a "time of holding a dried substance from a time of completing a drying step to a time of starting a pulverization step", which is a feature of the present invention, is described in the following (2-5) "dried substance-holding time". It should be noted that, because a small scale experiment like in a laboratory makes experimental operations discontinuous, which may results in the case where dried substance-holding time of the present invention is attained, however, an embodiment of the present invention should indicate a large scale production in production facility (for example, 1 [t/hr] or more per line). Still more, it is industrially preferable that each step is connected and continuous production is attained as a whole.

[1] Definition of Terms (1-1) "Water-Absorbent Resin"

In the present description, the "water-absorbent resin" means a water-swelling and water-insoluble polymer gelling agent, and one having the following properties. That is, it means a polymer gelling agent having an absorbency against non-pressure (CRC/specified in ERT441.2-02 (2002)) of essentially equal to or higher than 5 g/g, preferably 10 to 100 g/g, and further preferably 20 to 80 g/g, and in addition, water-soluble content (Extractables/specified in ERT470.2-02 (2002)) of essentially 0 to 50% by weight, preferably 0 to 30% by weight, further preferably 0 to 20% by weight, and particularly preferably 0 to 10% by weight.

It should be noted that, the water-absorbent resin is not limited to a form where whole amount (100% by weight) is a polymer, and may include an additive which is described later or the like in a range to maintain the performance. That is, even a water-absorbent resin composition is called generically a water-absorbent resin in the present invention. In the case of containing other additive and the like, content of the water-absorbent resin, in particular, a polyacrylic acid (salt)-based water-absorbent resin is preferably 70 to 99.9% by weight, more preferably 80 to 99.7% by weight, and still more preferably 90 to 99.5% by weight, relative to total amount. As components other than the water-absorbent resin, in view of water absorbing speed or impact resistance of powders (particles), water is preferable, and an additive to be described later may be contained, as needed.

(b) "Polyacrylic Acid (Salt)"

In the present description, the "polyacrylic acid (salt)" means a (co)polymer having acrylic acid (salt) as a principal component, as a repeating unit. Specifically, it contains acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the (co)polymer contains essentially a water-soluble salt, which is preferably a monovalent salt, still more preferably an alkali metal salt or an ammonium salt, particularly among them, preferably an alkali metal salt, and still more a sodium salt. It should be noted that a form thereof is not especially limited, however, it is preferably powder (which may be referred to as "particle").

(1-3) EDANA and ERT

In the present description, "EDANA" is an abbreviation of European Disposables and Nonwovens Association, and "ERT" is an abbreviation of measurement method for a water-absorbent resin of an European standard (nearly a world standard) (ERT/EDANA Recommended Test Method). In the present description, unless otherwise specified, properties of a water-absorbent resin are measured based on the ERT original (known document: revised in 2002).

(a) "CRC" (ERT441.2-02)

"CRC" is an abbreviation of Centrifuge Retention Capacity and means absorbency against non-pressure (it may also be referred to simply "absorption capacity").

Specifically, it is absorbency (unit; g/g) after immersing 0.20 g of a water-absorbent resin in an aqueous 0.9% by weight sodium chloride solution for 30 minutes, and then draining water therefrom with a centrifugal separating machine.

(e) "AAP" (ERT442.2-02)

AAP is an abbreviation of Absorbency Against Pressure, and means absorption capacity under load.

Specifically, it means absorption capacity (unit; g/g) after swelling a water-absorbent resin with an aqueous 0.9% by weight sodium chloride solution under a load of 21 g/cm$^2$ for 1 hour. It should be noted that in the present invention, it was measured under a load of 50 g/cm$^2$.

(c) "Ext" (ERT470.2-02)

"Ext" is an abbreviation of Extractables, and means a water-soluble content (amount of water-solubles).

Specifically, it is a value (unit; % by weight) obtained by stirring 1 g of a water-absorbent resin in 200 g of an aqueous 0.9% by weight sodium chloride solution for 16 hours, and measuring an amount of dissolved polymer by pH titration.

(d) "Residual Monomers" (ERT410.2-02)

"Residual Monomers" mean an amount of monomers remaining in a water-absorbent resin. Specifically, it is a value (unit; ppm by weight) obtained by charging 1 g of a water-absorbent resin into 200 cm$^3$ of an aqueous 0.9% by weight sodium chloride solution, stirring the mixture for 1 hours, and measuring an amount of eluted monomers into the aqueous solution by high-performance liquid chromatography.

(1-4) Liquid Permeability

In the present description, "liquid permeability" means fluid flow among swollen gel particles under load or without load. As a typical evaluation method thereof, there is an evaluation method of "SFC (Saline Flow Conductivity)" disclosed in U.S. Pat. No. 5,562,646 or the like. SFC measured by this evaluation method is referred to also as "Saline Flow Conductivity".

(1-5) Hydrogel, Dried Substance and Powder Substance

In the present invention, the "hydrogel", the "dried substance" and the "powder substance" are defined as follows.

The "hydrogel" indicates a hydrogel-like polymer of a water-absorbent resin. As a representative thereof, it means a gel of a water-absorbent resin swollen with water, and means a hydrogel-like polymer obtained by a polymerization step of an aqueous monomer solution, specified by claim 1.

That is, the hydrogel-like polymer specified by claim 1 can be obtained using an aqueous monomer solution, and provide a "hydrogel" of the present invention, irrespective of its moisture content, as long as it contains water. It should be noted that a moisture content (water content) of a hydrogel is determined as appropriate depending on polymerization conditions (for example, solid content of an aqueous monomer solution, moisture evaporation amount during polymerization and the like), however, usually it is preferably 25% by weight or higher, and more preferably 30% by weight or higher.

The "dried substance" is referred to as a dried polymer of water-absorbent resin obtained via a drying step after polymerization. Although a water content after drying depends on an object or water content after polymerization, it is usually reduced by 5% by weight or more in the drying step, and as a result, it indicates a dried polymer having a water content of below 30% by weight, still more below 25% by weight, still more 20% by weight or less, and particularly 3 to 15% by weight. Shape thereof is not limited and drying may be performed at the same time as polymerization (drying by heat of polymerization or by heating during polymerization or the like), however, it is further dried.

The "powder substance" is referred to as a solid with a particle diameter specified by sieve classification of equal to or smaller than 5 mm, and a powder substance of dried polymer of water-absorbent resin, or a powder substance (for example, water-insoluble inorganic powder, polyvalent metal salt powder or a hydrate salt thereof and the like) used as a solid as it is, among raw materials of water-absorbent resin or additives. Although water content is not limited as long as it is a solid, it is usually below 30% by weight, still more below 25% by weight, and still more equal to or lower than 20% by weight. The lower limit of particle diameter is not especially limited, however, for example, it is 1 nm, and still more 10 nm. It means a solid having certain fluidity as powder substance, for example, in a state that its Flow Rate (ERT450.2-02) can be measured as fluidity, or which can be sieve classified by (ERT420.2-02). It should be noted that, in general, there may be the case where those of equal to or larger than 1 mm are called particles, and those of below 1 mm are called powder substances, however, in the present invention, those power particle substances (water-absorbent resin or raw materials thereof) are called generally as "powder substance" hereafter. In addition, in the present description, the "powder substance" and "powder" are used as synonyms.

(1-6) Others

In the present description, "X to Y" showing a range indicates to be equal to or higher than X and equal to or lower than Y. In addition, "mass", "parts by mass" and "% by mass" are used synonymously to "weight", "parts by weight" and "% by weight", respectively, and "ton" means "metric ton". Unless otherwise specified, "ppm" should mean "ppm by mass" or "ppm by weight".

Still more, property or the like is measured at room temperature (20 to 25° C.)/a relative humidity of 40 to 50%, unless otherwise specified.

[2] Production Method for Particulate Water-Absorbent Resin (2-1) Aqueous Solution of Acrylic Acid (Salt)

(a) Monomer

An unsaturated monomer which may be used in the present invention is not especially limited, and include "acrylic acid (salt) alone" or "combined use of acrylic acid (salt) and a monomer other than acrylic acid". Among these, in view of properties (for example, absorption capacity, extractables, liquid permeability and residual monomer content, or the like) of the water-absorbent resin, acrylic acid and/or a salt thereof may be preferably used.

In addition, in the case of using an acid group-containing monomer, still more, acrylic acid, as a repeating unit of a polymer, the acid group may be neutralized in a form of a monovalent salt, preferably an alkali metal salt or an ammonium salt, more preferably an alkali metal salt, and particularly preferably a sodium salt. A neutralization of the acid group is performed in a neutralization ratio range of 0 to 100% by mole, preferably 20 to 100% by mole, still more preferably 30 to 99% by mole, still more preferably 50 to 99% by mole, still more preferably 55 to 95% by mole, and particularly preferably 60 to 90% by mole, before polymerization or after polymerization.

The neutralization may be performed for the polymer (hydrogel) after polymerization, or polymerization may be performed using acrylic acid salt as a monomer. In view of enhanced productivity or AAP (absorbency against pressure), SFC (liquid permeability under pressurization, saline flow conductivity) or the like, however, a neutralized monomer, that is, a partially neutralized salt of acrylic acid as a monomer may be preferably used. Such a salt of acrylic acid is not especially limited, however, in view of water-absorbing performance of the water-absorbent resin, it is preferably a monovalent salt of acrylic acid selected from an alkali metal salt, an ammonium salt and an amine salt of acrylic acid, more preferably an alkali metal salt of acrylic acid, and still more preferably an acrylate selected from sodium salt, lithium salt and potassium salt, and particularly preferably sodium salt.

In the case of using an unsaturated monomer other than acrylic acid (salt) (other monomer), as the other monomer, a hydrophilic or hydrophobic unsaturated monomer may be used. The other monomer which can be used includes methacrylic acid, maleic acid (or anhydride thereof), 2-(meth)acrylamido-2-methylpropane sulfonic acid, (meth)acryloxyalkane sulfonic acid, N-vinyl-2-pyrrolidone, N-vinylacetamide, (meth) acrylamide, N-isopropyl (meth) acrylamide, N,N-dimethyl(meth)acrylamide, 2-hydoxyethyl(meth)acrylate, methoxy polyethylene glycol (meth)acrylate, polyethylene glycol (meth)acrylate, stearyl acrylate and salts thereof. When such other monomer is used, use amount thereof is not especially limited, as long as it should not impair desired characteristics. It is preferably equal to or lower than 50% by mole, more preferably 0 to 30% by mole, and particularly 0 to 10% by mole, relative to total monomers. When the other monomers are used, they may be used each alone, or may be used in a mixture form of two or more members.

(b) Inner Cross-Linking Agent

The inner cross-linking agent which can be used in the present invention is not especially limited, and may include, for example, one member or two or more members selected among compounds having at least two polymerizable double bonds in its molecule, such as N,N'-methylenebisacrylamide, (poly)ethylene glycol di(meth)acrylate, (poly)propylene glycol di(meth)acrylate, (polyoxyethylene) trimethylolpropane tri(meth)acrylate, trimethylolpropane di(meth)acrylate, poly (meth)allyoxy alkane, or the like; and compounds capable of forming a covalent bond by reacting with a carboxylic group, such as polyglycidyl ethers (ethylene glycol diglycidyl ether or the like), polyols (ethylene glycol, polyethylene glycol, glycerin, sorbitol) or the like.

In the case of using the inner cross-linking agent, in consideration of absorbency or the like of the resultant water-absorbent resin, it is preferable to use essentially a compound having at least two polymerizable double bonds in its molecule. In addition, the inner cross-linking agent is used in an amount in the range of 0.0001 to 5% by mole, and preferably 0.005 to 2% by mole, relative to 1 mole of the monomer.

(c) Concentration

The above unsaturated monomer is usually polymerized in an aqueous solution state, and a concentration of the monomer is usually in the range of 10 to 90% by weight, preferably 20 to 80% by weight, still more preferably 30 to 70% by weight, and particularly preferably 30 to 60% by weight.

In addition, a surfactant, a polymer compound such as polyacrylic acid (salt) or cross-linked substance thereof (water-absorbent resin), starch, polyvinyl alcohol or the like, various chelating agents, various additives (other components) may be added to the unsaturated monomer, as needed. Among these, the method of the present invention is preferable to further include a step for adding a chelating agent. By using the chelating agent, color stability (color stability in storing the particulate water-absorbing agent under high temperature and high humidity condition for a long period) and urine resistance (prevention of gel deterioration) of the water-absorbent resin of the present invention can be enhanced.

The chelating agent as used herein is not especially limited, and for example, chelating agents exemplified in EP 1426157 A1 and WO 2007/28751 and WO 2008/90961 may be used. In view of effect thereof, the chelating agent is preferably a water-soluble organic chelating agent with a molecular weight of 100 to 1000. Specifically, as the preferable chelating agent, an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, and salts thereof; and an aminopolyvalent phosphoric acid compounds such as ethylenediamine-N,N'-di(methylenephosphinic acid), ethylenediamine tetra(methylenephosphinic acid), polymethylenediamine tetra(methylenephosphonic acid), diethylenetriamine penta (methylenephosphonic acid), 1-hydroxyethylidene diphosphonic acid, and salts thereof may be cited.

In the case of further using other component as described above, the addition amount thereof is not especially limited, however, it is preferably over 0 part by weight and 30 parts by weight or less, and more preferably 0.0001 to 20 parts by weight, relative to 100 parts by weight of the unsaturated monomer. It should be noted that the aqueous solution of the present application may include a dispersion solution having over saturation concentration, however, preferably polymerization is performed in a saturated concentration or lower.

(d) Salt for Neutralization

In the case of using an acrylate salt as a monomer, as a basic substance to be used in neutralization of a polymer or acrylic acid, a monovalent base such as a hydroxide of an alkali metal such as sodium hydroxide, potassium hydroxide, lithium hydroxide, or a (hydrogen) carbonate salt such as (hydrogen) sodium carbonate, (hydrogen) potassium carbonate is preferable, and a sodium salt such as sodium hydroxide is particularly preferable. It should be noted that preferable conditions and the like in neutralization step are exemplified in EP Patent No. 574260, and conditions described in the publication are also applicable to the present invention. Neutralization temperature is determined, as appropriate, from 10 to 120° C., and still more 30 to 110° C.

(2-2) Polymerization Step (a) Polymerization Method

The particulate water-absorbent resin of the present invention can be produced by cross-linking polymerization of the unsaturated monomer to obtain a hydrogel-like polymer. Polymerization is performed usually by a method for spray polymerization, dropping polymerization, aqueous solution polymerization, or reversed phase suspension polymerization, in view of easy control of performance and polymerization.

Reversed phase suspension polymerization is a polymerization method for suspending an aqueous solution of a monomer in a hydrophobic organic solvent, which is disclosed, for example, in US Patents such as U.S. Pat. No. 4,093,776, U.S. Pat. No. 4,367,323, U.S. Pat. No. 4,446,261, U.S. Pat. No. 4,683,274, and U.S. Pat. No. 5,244,735.

In addition, aqueous solution polymerization is a method for polymerization of an aqueous solution of a monomer without using a dispersing solvent, which is disclosed, for example, in US Patents such as U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808; or in EP Patents such as EP Patent No. 0811636, EP Patent No. 0955086, EP Patent No. 0922717, and EP Patent No. 1178059. It should be noted that in polymerization of the present invention, a monomer, an inner cross-linking agent, a polymerization initiator, other additives or the like described in these patent literatures may be used as well.

In the present invention, in view of property or drying efficiency of the resultant particulate water-absorbent resin, it is preferable that at least a part of a polymerization solvent is evaporated by polymerization heat during the polymerization. For example, a solid content of the hydrogel-like polymer is increased, before and after polymerization, by preferably 0.1% by weight, more preferably 1 to 40% by weight, still more preferably 2 to 30% by weight, and particularly preferably 3 to 20% by weight. The degree of increase in the solid content of the hydrogel-like polymer can be determined, as appropriate, depending on temperature during polymerization, air flow or shape (particle diameter of polymer gel or sheet thickness) or the like.

The polymerization may be performed even in air atmosphere, however, it is preferably performed in an inert gas atmosphere such as nitrogen or argon, for example, in an atmosphere having an oxygen concentration of equal to or lower than 1% by volume. In addition, it is preferable that the monomer component is used for polymerization, after dissolved oxygen is sufficiently substituted with inert gas to a dissolved oxygen concentration of below 1 (mg/L).

Polymerization is performed usually by aqueous solution polymerization, or reversed phase suspension polymerization, in view of easy control of performance and polymerization, and in particular, aqueous solution polymerization, where particle size control has conventionally been difficult, probably due to irregularly-sized particle thereof, and still more continuous aqueous solution polymerization.

The present invention can exert effects of particle size control in producing or pulverization in a practical machine scale, in particular, in a large scale, rather than in a laboratory scale. That is, in obtaining a particulate water-absorbent resin by polymerization of an aqueous solution of an unsaturated monomer, it is preferable to perform polymerization or pulverization of the particulate water-absorbent resin in a scale of 1 t/hr or more, more preferably 2 t/hr or more, still more preferably 5 t/hr or more, and particularly preferably 10 t/hr or more, per line or apparatus, in terms of production capacity (it should be noted that "ton" and "t" means metric ton, that is 1000 kg is 1 ton). The present invention may be applied preferably to continuous polymerization and continuous pulverization in such a large scale. Although the upper limit of the production capacity in the present invention is not especially limited, it may be set to 100 t/hr per line or apparatus, for example.

Preferable embodiments of continuous polymerization include continuous kneader polymerization (for example, U.S. Pat. No. 6,987,151, U.S. Pat. No. 6,710,141 and US Publication No. 2008/0080300), and continuous belt polymerization (for example, U.S. Pat. No. 4,893,999, U.S. Pat. No. 6,241,928 and US Publication No. 2005/215734 or the like).

In the continuous polymerization, polymerization under conditions as of high temperature initiation (a monomer temperature of 30° C. or higher, 35° C. or higher, still more 40° C. or higher, and particularly 50° C. or higher; the upper limit is a boiling point), and high monomer concentration (30% by weight or higher, particularly 35% by weight or higher, still more 40% by weight or higher, still more 43% by weight or higher, and particularly 45% by weight or higher; the upper limit is a saturated concentration or lower, or 70% by weight or lower) may be exemplified as one preferable example.

(12) Polymerization Initiator

The polymerization initiator which can be used in the present invention can be selected as appropriate depending on polymerization form. As such a polymerization initiator, preferably a water-soluble polymerization initiator, still more photodecomposition-type polymerization initiator, a thermal decomposition-type polymerization initiator, a redox-type polymerization initiator or the like can be exemplified. In addition, it is also preferable that the photodecomposition-type polymerization initiator and the thermal decomposition-type polymerization initiator are used in combination.

As the polymerization initiator, for example, persulfates such as sodium persulfate, potassium persulfate, ammonium persulfate; hydrogen peroxide; azo compounds such as 2,2'-azobis(2-amidinopropane)dihydrochloride, 2,2'-azobis[2-(2-imidazoline-2-yl)propane]dihydrochloride may be exemplified. As the redox-type polymerization initiator, for example, a system which uses a reducing compound such as L-ascorbic acid or sodium hydrogen sulfite in combination with the persulfate salt or peroxide may be exemplified.

Amount of the polymerization initiator is preferably 0.0001 to 1% by mole, and more preferably 0.001 to 0.5% by mole, relative to the monomer.

(2-3) Fine Granulation Step of Hydrogel-Like Polymer (Fine Granulation Step)

A hydrogel-like polymer before being dried is preferably finely granulated during polymerization or after polymerization, in view of drying efficiency and pulverization efficiency after drying. A fine granulation method is not especially limited, and known methods may be used similarly. For example, a gel may be finely granulated (pulverized) using a crushing machine (a kneader, a meat chopper, a cutter mill or the like). A temperature of the hydrogel in gel fine granulation is not especially limited, however, in view of property, granulation is performed at preferably 40 to 100° C., and still more 50 to 70° C. A resin solid content of the hydrogel is within the above range. To the hydrogel, water or a polyhydric alcohol, a mixed solution of water and polyhydric alcohol, a solution where a polyvalent metal is dissolved in water, or steam thereof may be added.

For example, a block-like, a sheet-like hydrogel-like polymer obtained by aqueous solution polymerization in the present invention may be pulverized using a pulverization apparatus to make particulate hydrogel, and then dried. In addition, in spraying polymerization, dropping polymerization, and reversed phase suspension polymerization, particulate hydrogel may be obtained by polymerization, which corresponds to fine granulation during polymerization. Such particulate hydrogel after polymerization may be dried as it is, or particle size thereof may be adjusted by further pulverization or granulation, as needed.

As preferable particle diameter of particulate hydrogel, weight average particle diameter (D50) determined by standard sieve classification may be within the range of 0.5 to 10 mm, preferably within the range of 1 to 5 mm, still more 1 to 3 mm, and particularly preferably 1 to 2 mm.

As a method for controlling the particle size within the above range, in the fine granulation step of the hydrogel-like polymer, U.S. Pat. No. 6,906,159, U.S. Pat. No. 5,275,773, U.S. Pat. No. 6,100,305, U.S. Pat. No. 6,140,395, U.S. Pat. No. 6,875,511, and US Publication No. 2004/234607, US Publication No. 2005/46069 or the like may be adopted.

Also in the case where hydrogel before being dried contains a gel particle having a particle diameter of 3 mm or larger, the present invention may be applied suitably. In this way, a gel pulverization step can be attained conveniently for a short time. In addition, although a ratio of gel particle having a particle diameter of 3 mm or larger in the hydrogel before being dried is not especially limited, it is preferably 0.5 to 60% by weight, relative to the hydrogel before being dried. In this case, although a ratio of gel particle having a particle diameter below 850 μm in the hydrogel before being dried is not especially limited, it is preferably 1 to 50% by weight, and more preferably 2 to 35% by weight, relative to the hydrogel before being dried. A water content of the hydrogel before being dried may be in the above range.

(2-4) Drying Step

In the drying step, moisture of the hydrogel is dried to an objective range using a drying machine. As a drying method in the present invention, various drying machines or drying methods may be adopted so as to attain objective water content, within a common knowledge of those skilled in the art. As the drying machines which can be used, a conductive heat transfer-type drying machine, a radiant heat transfer-type drying machine (for example, infrared ray drying), a hot air heat transfer-type drying machine, a dielectric heating-type drying machine (for example, microwave drying), or azeotropic dehydration with a hydrophobic organic solvent, or a combination thereof may be cited. The drying may be performed under reduced pressure, however, in view of drying efficiency, a hot air heat transfer-type drying machine (in particular, a through-circulation band drying machine) is preferably used.

As a hot-air drying method, a method for drying in a static state, a method for drying in a stirring state, a method for drying in a vibrating state, a method for drying in a flowing state, a method for drying by air flow or the like may be cited. Among these, in view of efficiency, fluid-bed drying or ventilation drying (still more, through-circulation band drying) is preferable, through-circulation band drying is more preferable, and still more hot-air drying using continuous ventilation drying (continuous through-circulation band drying) is particularly preferably used.

Drying is performed at a temperature in the range of usually 100 to 250° C., preferably 100 to 220° C., more preferably 120 to 200° C., still more preferably 135 to 195° C., and particularly preferably 150 to 190° C. A drying time is selected so as to attain an objective water content, depending on surface area and water content of a polymer, along with kind and air flow amount of a drying machine. For example, a drying time may be selected, as appropriate, within the range of 1 minute to 1 hour. By setting such drying temperature or drying time, the resultant particulate water-absorbent resin can excel in absorbency (CRC), have small soluble contents (Extractables), and suppress and prevent decrease in whiteness degree.

A solid content of the dried substance by the drying is not especially limited, however, it is preferably increased so as to attain solid content of, in the order of, 85 to 95% by weight, 85 to 97% by weight, 88 to 95% by weight, 90 to 95% by weight. That is, water content of the dried substance is not especially limited, however, it is preferably within the above range.

(2-5) Dried Substance-Holding Time (a) Definition

Dried substance-holding time which is a feature of the present invention is referred to as a time from a time of completing the drying step to a time of starting the pulverization step. A "time of completing the drying step" indicates a time for taking out a dried substance from a drying machine, that is, a time when a dried substance is discharged from a drying machine or a time when heating is completed in the drying machine, that is, a time for stopping forced heating in a drying machine. The drying machine as used herein is an apparatus specified in the drying step, and the drying machine may have both rolls of the drying step and the cooling step at the latter half of the drying time (for example, in continuous through-circulation band drying, when the former half is used as a drying machine, and the latter half, particularly, near the end, is used as a cooling machine, so that the latter half of the drying machine takes also a role of the cooling step, the cooling step is started in the drying machine). In addition, a "time of starting the pulverization step" indicates a time when a dried substance discharged from a drying machine is charged into a pulverization machine via a storage step and a transportation step and the like. That is, dried substance-holding time indicates a time from a "time of completing the drying step" to a "time of starting the pulverization step".

The dried substance-holding time corresponds to a total time of what is called intermediate steps. In the present invention, the drying step and the pulverization step are not connected directly, but "a transportation step of the dried substance" and "a step for storing of the dried substance" are essentially included as the intermediate step to take holding time, and still more "a cooling step of the dried substance" and "a coarse crushing step of the dried substance aggregated" may be contained, as needed.

The present invention noticed a time between (2-4) a drying step and (2-6) a pulverization step, so as to have a feature of adding an intermediate step having a certain time. The present invention is a method for solving problems in general drying methods and pulverization methods, and can provide easy pulverization by setting a dried substance-holding time. Description will be given below on estimated mechanism thereof, however, the present invention should not be limited to this estimated mechanism. Although the resultant dried substance seems to have been dried uniformly as a whole, it is considered that moisture distribution inside one particle is inhomogeneous, particle surface contacting with heating medium such as hot air, a heat transfer tube or the like has a low water content, inside the particle has a high water content, and the larger particle has the larger difference of water content between at the surface and the inside of the particle. On the other hand, it is considered that the dried substance after elapse of a certain dried substance-holding time has nearly uniform moisture distribution. In the present invention, easy particle diameter control in pulverization is estimated to owe to this uniformity of moisture distribution.

(b) Time and Temperature

Figure 2:
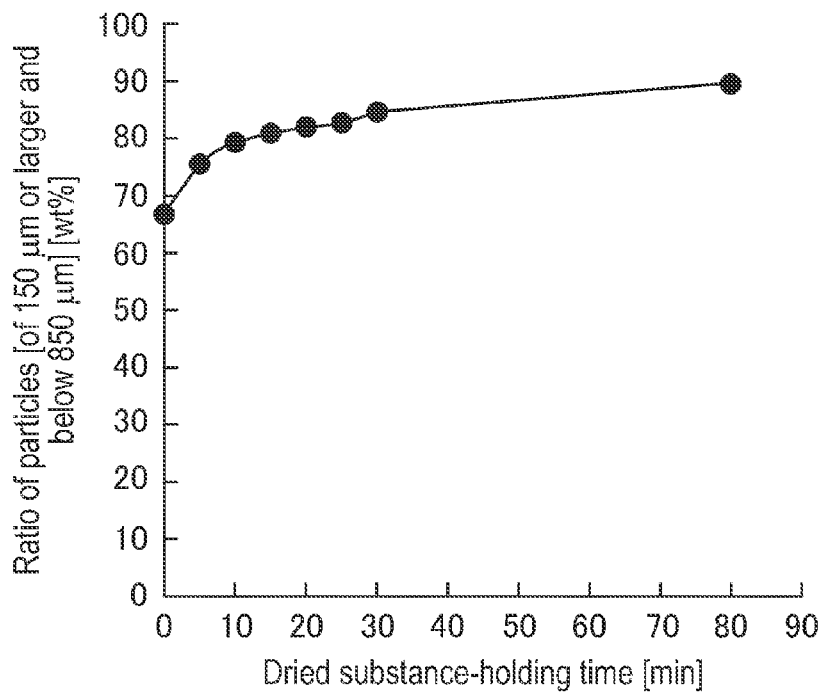
FIG. 2 is a drawing showing results of Examples 1 to 7 and Comparative Example 1 (correlation between dried substance-holding time and ratio of particles having a particle diameter of 150 μm or larger and below 850 μm).
Figure 3:
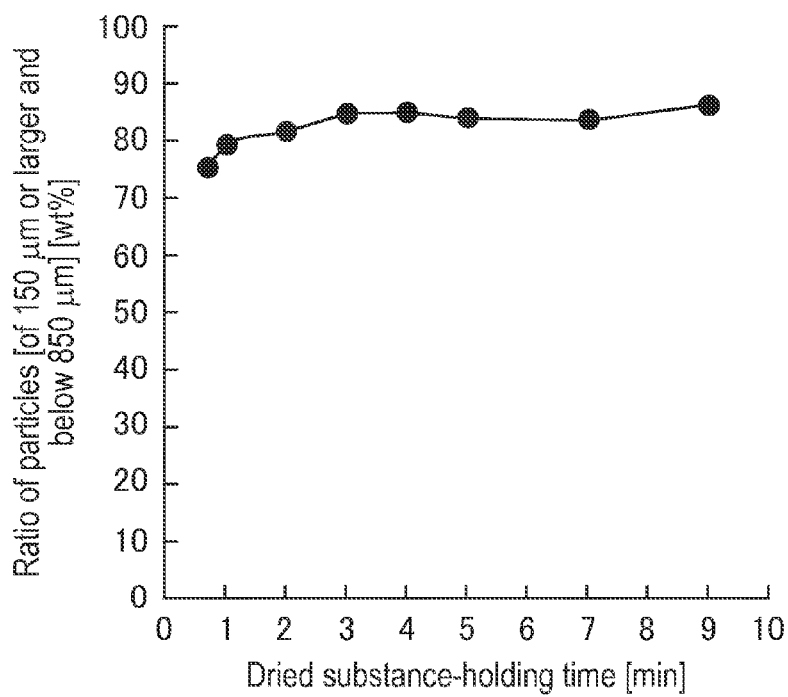
FIG. 3 is a drawing showing results of Examples 8 to 12 and Comparative Examples 2 to 4 (correlation between dried substance-holding time and ratio of particles having a particle diameter of 150 μm or larger and below 850 μm).

A dried substance-holding time, that is a period of a dried substance from coming out a drying machine to entering a pulverization machine, is preferable in the order of 3 minutes or more (within 10 hours), 5 minutes to 3 hours, 7 minutes to 2 hours, 10 minutes to 1.5 hour, 10 minutes to 1 hour, 15 minutes to 1 hour, 20 minutes to 1 hour, and 20 minutes to 50 minutes. By setting at such dried substance-holding time, a ratio of particles with a desired particle diameter of 150 μm or larger and below 850 μm in a pulverized substance can be enhanced sufficiently (preferably to 75% by weight or more, still more preferably to 80% by weight or more, relative to the whole particles). Among these, when a water content of a dried substance is relatively high, in particular, 9% by weight or higher, as shown in FIG. 2 of Examples 1 to 7, FIG. 6 of Examples 23 to 26, FIG. 7 of Examples 27 to 30, and FIG. 8 of Examples 31 to 34, the longer dried substance-holding time is the better, in view of particle size control (for example, preferably 10 minutes or longer, more preferably 15 minutes or longer, and particularly preferably 20 minutes or longer), while when a water content is relatively low, in particular, below 9% by weight, as shown in FIG. 3 of Examples 8 to 12, FIG. 4 of Examples 13 to 18, and FIG. 5 of Examples 19 to 22, a shorter dried substance-holding time is preferable, as compared with the case where a water content of a dried substance is high, for example, in such a case, 3 minutes or longer, and still more preferably 5 minutes or longer of a dried substance-holding time is preferable. The reason for this is supposed as follows. In the drying step, a water content at the surface of the particulate hydrogel firstly decreases, and then a water content in the dried substance decreases. That is, it is considered that difference of water content between at the surface and the inside of the dried substance widens at the first stage, but with progress of drying, drying inside the particulate hydrogel also proceeds, and thus difference of water content between at the surface and the inside does not widen, and with still more progress of drying, when the surface is sufficiently dried, it is considered that difference of water content between at the surface and the inside becomes narrowed on the contrary. Therefore, when a water content of a dried substance is high, in particular, a water content is 9% by weight or higher, it is preferable that a dried substance-holding time is set relatively longer so that drying proceeds further (so as to decrease difference of water content between at the surface and the inside), as compared with a preferable dried substance-holding time. On the contrary, when a water content of a dried substance is low, in particular, the water content is below 9% by weight, it is considered that the surface is sufficiently dried even when a preferable dried substance-holding time is relatively short, and a water content at the surface and the inside can be made sufficiently low. To attain a dried substance-holding time below 3 minutes by decreasing difference of water content between at the surface and the inside, however, a longer drying period is required, a drying machine becomes a big size, as well as a dried substance is deteriorated. It should be noted that the present invention should not be limited to the above estimation.

There are many specific embodiments of an intermediate step to hold a dried substance, including forced cooling by a cooling machine (using the latter half of a drying machine), a conveyor, transportation by air flow, storage in a hopper and the like. Because cooling makes pulverization easy, a cooling step is preferably installed. A holding temperature of a dried substance is preferably 40 to 100° C., still more 45 to 90° C., and particularly 50 to 80° C. For such temperature control, a dried substance after drying step may be controlled at the temperature by warming or heating. This warming or heating may be performed, as appropriate, in an apparatus which is described later. It should be noted that, by heating in the intermediate step, water content of a dried substance is not substantially changed. In addition, a carrying machine (a conveyor or the like) or a storage machine (a hopper or the like) is generally classified to an apparatus different from a drying machine. Specifically, decrease in water content may be below 1% by weight before and after the heating. Heating in the intermediate step means heating aiming at setting atmosphere temperature, and even when temperature of a dried substance is raised by this heating, it is different from heating aiming at decreasing water content in the drying step, for example, decreasing water content from 40% by weight to 5% by weight.

(c) Different Holding Time

Figure 12:
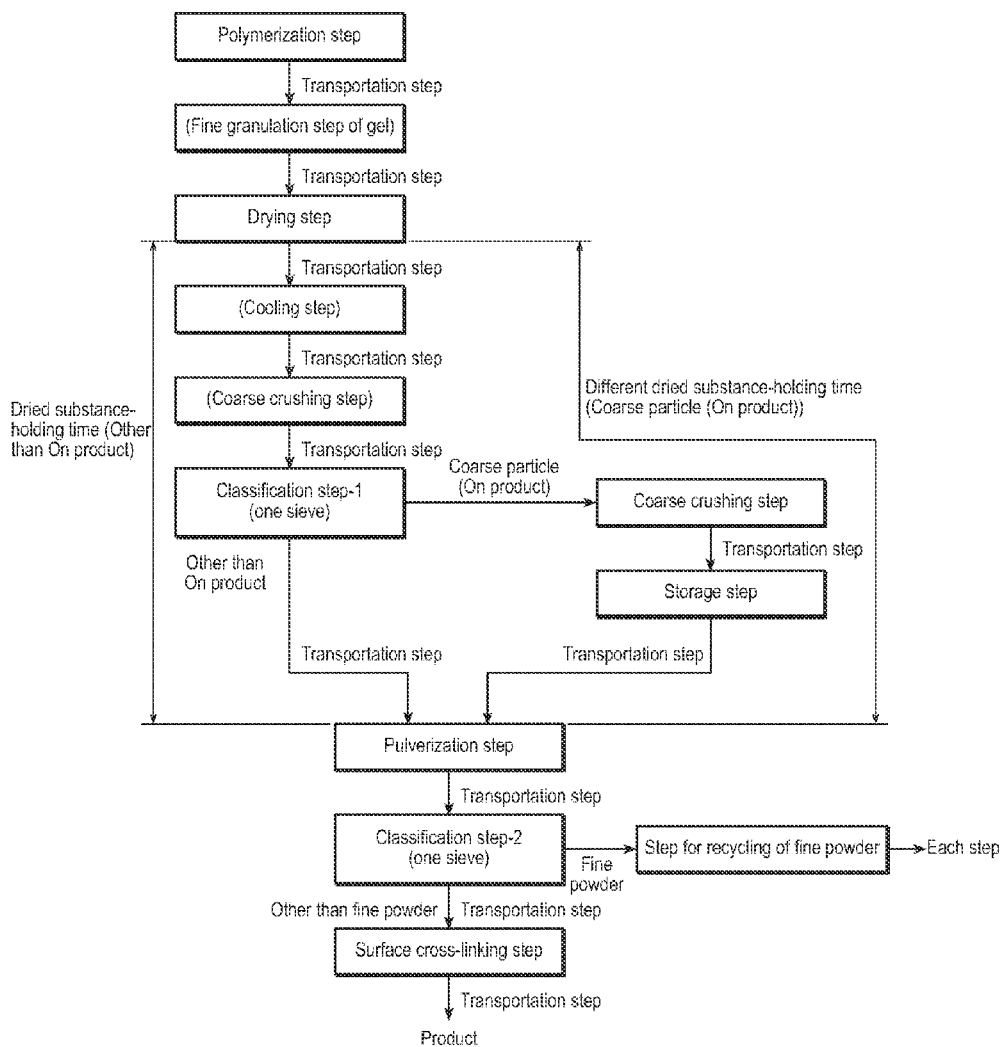
FIG. 12 is a schematic flow diagram showing a fourth production process relevant to an embodiment of the present invention.
Figure 13:
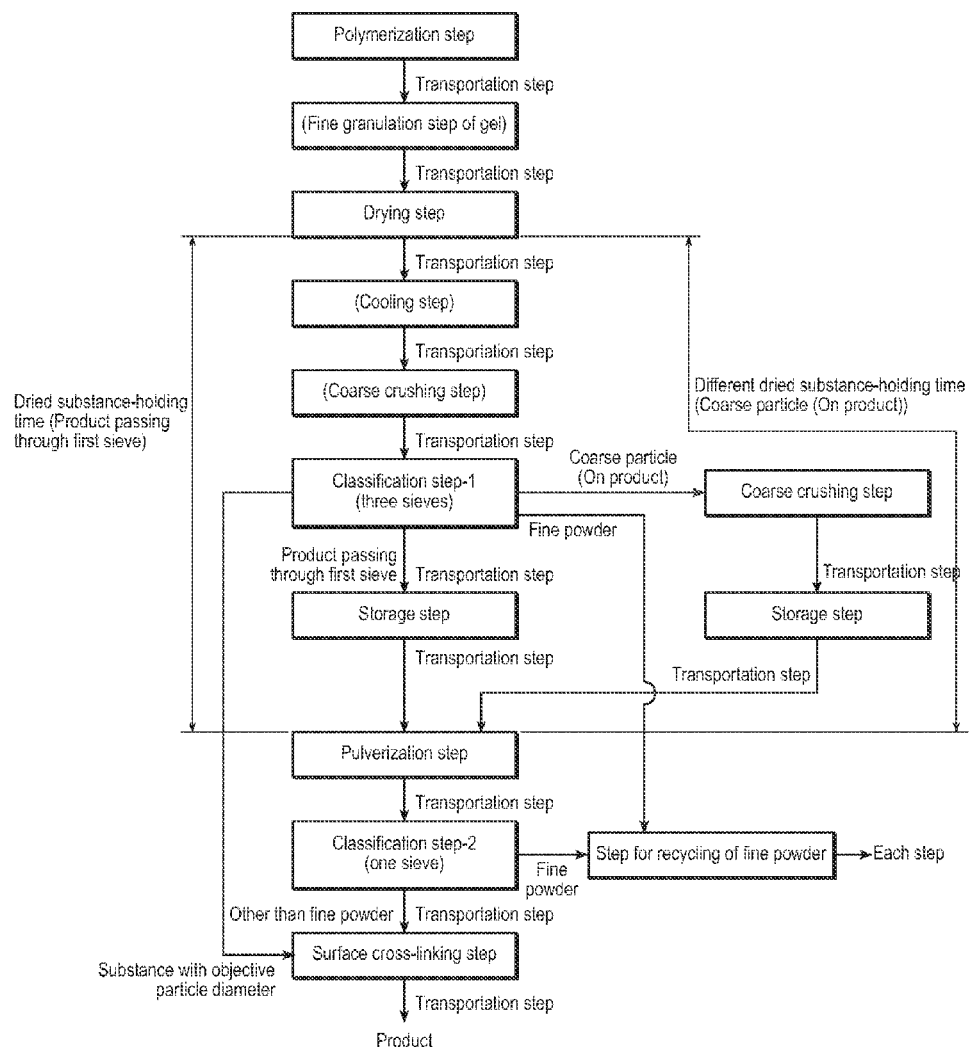
FIG. 13 is a schematic flow diagram showing a fifth production process relevant to an embodiment of the present invention.
Figure 14:
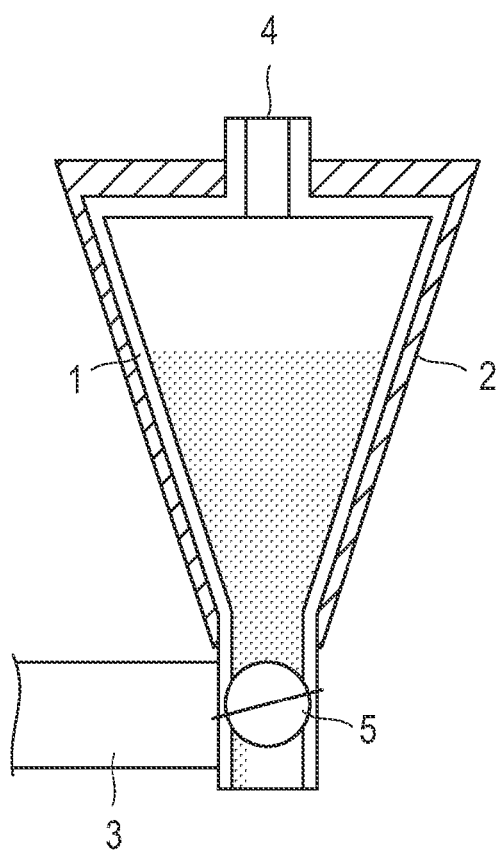
FIG. 14 is a schematic drawing showing a hopper included in the production process of FIG. 9 to FIG. 13.

A "different holding time (of dried substance)" in the present description intends a case where a holding time is changed by each classified substance discharged from each classification step (that is, based on a size of water-absorbent resin), by setting a classification step between a drying step and a pulverization step. In this way, in the case of different holding times (in the case of different holding times of (dried substance)), "(b) to set a dried substance-holding time from a time of completing the drying step to a time of starting the pulverization step at 3 minutes or longer", as an essential constitution in the present invention, means that the shortest dried substance-holding time among dried substance-holding times for each classified substance discharged from each classification step, is three minutes or longer. A suitable flow chart of the different holding times or holding methods of dried substance is represented by FIG. 12 to FIG. 14, however, it should not be limited thereto.

In this step, a dried substance is classified with a sieve having a mesh size of 2 to 10 mm, and a coarse particle (aggregated substance) may be re-dried or subjected to an operation to crush the aggregation (coarse crushing). A method for coarse crushing is similar to (e) coarse crushing step after drying, to be described later (refer to the following description). By the classification, a dried substance is divided to two or more parts by its particle diameter. In view of balance between facility and effect, three or less kinds of mesh size of the sieves may be preferably used, and the number of dried substances to be divided is preferably four or less. In addition, as for a coarse particle (for example, product on a standard sieve of mesh size of preferably 850 µm to 10 mm, more preferably 2 to 10 mm), because a long period is required to attain uniform moisture, it is desirable to have a dried substance-holding time longer (preferably 1.01 to 10 times, still more 1.03 to 5 times), as compared with a small particle (for example, product passing through the standard sieve). Since a large particle may have higher water content (for example, water content of 1.01 to 5 times, still more 1.03 to 2 times), as compared with a small particle, in view of surface area of particle and drying efficiency, different holding times or holding methods of dried substance can be applied to particles of dried substance having different water contents.

That is, in the present invention, different holding times or different holding methods of dried substance is preferably used by each particle diameter of the dried substance to be classified. Different particle diameters (specified by standard sieves) can be determined, as appropriate, for example, in the range of 850 µm to 10 mm, still more 2 to 10 mm.

Different dried substance-holding times may be determined, as appropriate, within a range suitable for pulverization. For particle diameter to be classified, for example, by performing more steps (d) to (h) etc. to be described later for a longer period for a particle having large particle diameter, a dried substance-holding time is lengthened preferably by 1.01 to 10 times, still more 1.03 to 5 times, as compared with the case of not performing it (or a particle with small particle diameter). As for a different holding method, a method for repeating or adding transportation, crushing, storage or the like, to be described later, may be adopted for a particle with large particle diameter or high water content.

Explanation will be given below on a preferable and detailed step contained in the step for holding a dried substance.

(d) Cooling Step

A dried substance in the present invention is preferably subjected to forced cooling in a cooling step. That is, it is preferable to perform a step for cooling a dried substance after the drying step. In this case, a forced cooling is performed, in view of attaining the present invention, so as give a temperature of dried substance in the range of preferably 95° C. or lower, more preferably 90 to 30° C., more preferably 85 to 35° C., still more preferably 80 to 40° C., and particularly preferably 70 to 45° C.

Forced cooling in the present invention is a step for performing an external and intentional cooling operation of a dried polymer, and as a method for forced cooling in the present invention, it is enough to cool a dried substance to a predetermined temperature, by intentionally setting a cooling step between a drying step and a pulverization step (preferably, pulverization step by a roll-type pulverization machine to be described later), and may be performed by contacting with a coolant (for example, air) with a temperature of a dried substance (usually, nearly drying temperature) or lower. For example, in view of cooling efficiency or fluidity of a dried substance in the present invention, a method for blowing warm air with a temperature of 90° C. or lower or cool air, preferably cool air cooled to room temperature, or room temperature or lower may be used, although it depends on drying temperature. Alternatively, the dried substance may be subjected to forced cooling in the following (f) transportation step or (h) storage step. For example, the case of using warm air (hot air) of 90° C. in cooling after drying at 180° C. corresponds to the cooling step in the present invention, in terms of forced cooling to drying temperature or lower, particular, 95° C. or lower.

A temperature of dried substance over 95° C. would make difficult peelability from a metal screen or punching metal of a drying machine, decrease drying efficiency, as well as largely decrease efficiency of pulverization or classification of a dried substance, which results in difficulty in obtaining a superior particulate water-absorbent resin with narrow particle diameter distribution. In addition, too low cooling temperature would not only require longer time or larger facility for cooling, but also, unexpectedly, generate an aggregated substance of particulate water-absorbent resin in pulverization or classification, which is not preferable. Still more, excess cooling may be disadvantageous also for forced heating to be described later or surface cross-linking, in view of property or energy.

(e) Coarse Crushing Step

The present invention comprises arbitrarily a coarse crushing step of a dried substance aggregated after the drying step. That is, the coarse crushing step of a dried substance aggregated may be performed after drying step. In the case where a dried substance is an aggregated substance (block-state substance), coarse crushing is a mechanical operation to convert the resultant dried substance to a particulate state having fluidity, and coarse crushing is a mechanical operation for lightly crushing the aggregate to attain a size of several mm to several tens mm, without bringing about physical distraction of the dried particle composing the aggregated substance, or significant decrease in particle diameter. This step is applied suitably particularly when a dried particle includes a dried particle or an aggregated substance with a size of 3 mm or larger, in particular, in an amount of 5% by weight or more.

Difference between pulverization to be described later and coarse crushing is in that the former is for mainly pulverization of a particle, while the latter is for mainly crushing of aggregation between particles (dried particles). Generally, coarse crushing provides a particle diameter of 850 μm or larger, as a main component (over 50% by weight), preferably 80% by weight or more, while the pulverization step provides a particle diameter below 850 μm, as a main component, preferably 70% by weight, and particularly 80% by weight or more.

In the case of drying in a laminated state, it should be noted also that particulate hydrogel easily becomes a block-like dried substance which lost fluidity by inter-particle aggregation after drying. Because such a block-like substance is an aggregated substance of dried particles, it does not have fluidity because of aggregation, although it has a continuous space and air permeability to inside the block, and thus a coarse crushing step is required.

A method for coarse crushing in the present invention is not especially limited, as long as it is capable of converting a dried substance or an aggregated substance thereof (block-like substance) to a particle with fluidity, preferably a particle with an average particle diameter of 2 mm or smaller. For example, one member or two or more members of a method for pulverization using a hammer-type pulverization machine, a jet air-flow-type pulverization machine or the like, and a conventionally known various pulverization or crushing methods may be used. In the case where aggregation in drying is weak, aggregation of a polymer may be coarsely crushed by classification with vibration to a dried polymer without using a pulverization machine. As such a coarse crushing apparatus, a pulverization machine different from a roll-type pulverization machine to be described later may be used suitably.

(f) Transportation Step

In the present invention, for dried substance-holding time, a transporting step of transporting a dried particulate water-absorbent resin using a transporting machine is essentially included. A transporting method as used herein is not especially limited, however, transportation step is preferably performed in pneumatic transportation or using a conveyor. In the transportation step, transportation is performed under reduced pressure or under pressurization, in view of stability of transportation, and a transportation apparatus is preferably warmed or heated at predetermined temperature, so as to maintain the temperature. In the case of pneumatic transportation under pressurization, a pressure thereof is in the range of preferably 0.05 to 7 MPa, and more preferably 0.1 to 3 MPa.

A transportation machine used in the transportation step, is not limited to the following, however, for example, various kinds of pneumatic transportations, such as high concentration pneumatic transportation, low concentration pneumatic transportation; and various conveyors such as a belt conveyor, a screw conveyor, a chain conveyor, a vibration conveyor, a bucket conveyor, a flight conveyor may be preferably included. Means for heating and/or warming an inner wall surface from exterior side may be equipped with.

A pneumatic transportation method, which may be used suitably for the transportation step for dried substance-holding time, may be exemplified in U.S. Pat. No. 6,817,557, US Publication No. 2007/0225160, WO 2007/104657, WO 2007/104673, WO 2007/104676 or the like. The pneumatic transportation may be one-stage pneumatic transportation, multi-stage pneumatic transportation having the one-stage pneumatic transportation connected, or thrust-flow using secondary air, as needed. In addition to the above, the pneumatic transportation may be also exemplified in WO 2009/119758 (PCT/JP2009/56161), WO 2009/119756 (PCT/JP2009/56159), and WO 2009/119754 (PCT/JP2009/56157), and such methods can be also used suitably.

In the transportation, in particular, in the pneumatic transportation, gas with a dew point of −100° C. to −5° C. is preferably used. In this transportation method, in view of stably maintaining superior property of the particulate water-absorbent resin, and enabling to suppress clogging phenomenon, dried air is preferably used as primary air and secondary air. Dew point of the air is preferably −30° C. or lower, more preferably −35° C. or lower, and particularly preferably −40° C. or lower. As a method other than using dried air, heated air may be used as well. A heating method is not especially limited, however, air may be heated directly using a heat source, or air may be heated indirectly by heating a transportation part or a pipeline to heat air to be passed therethrough. Temperature of the heated air is preferably 30° C. or higher, more preferably 50° C. or higher, and further preferably 70° C. or higher.

As a method for controlling dew point, it may be enough to dry appropriately gas, preferably air. A method for using a membrane dryer, a method for using a cooling adsorption-type dryer, a method for using a diaphragm drier, or a method for using them in combination may be used. In the case of using an adsorption-type dryer, it may be of heating regeneration-type, non-heating regeneration-type or non-regeneration-type. A dew point is also enough to be about −70° C., still more −50° C., in view of cost performance.

(g) Classification Step

Figure 10:
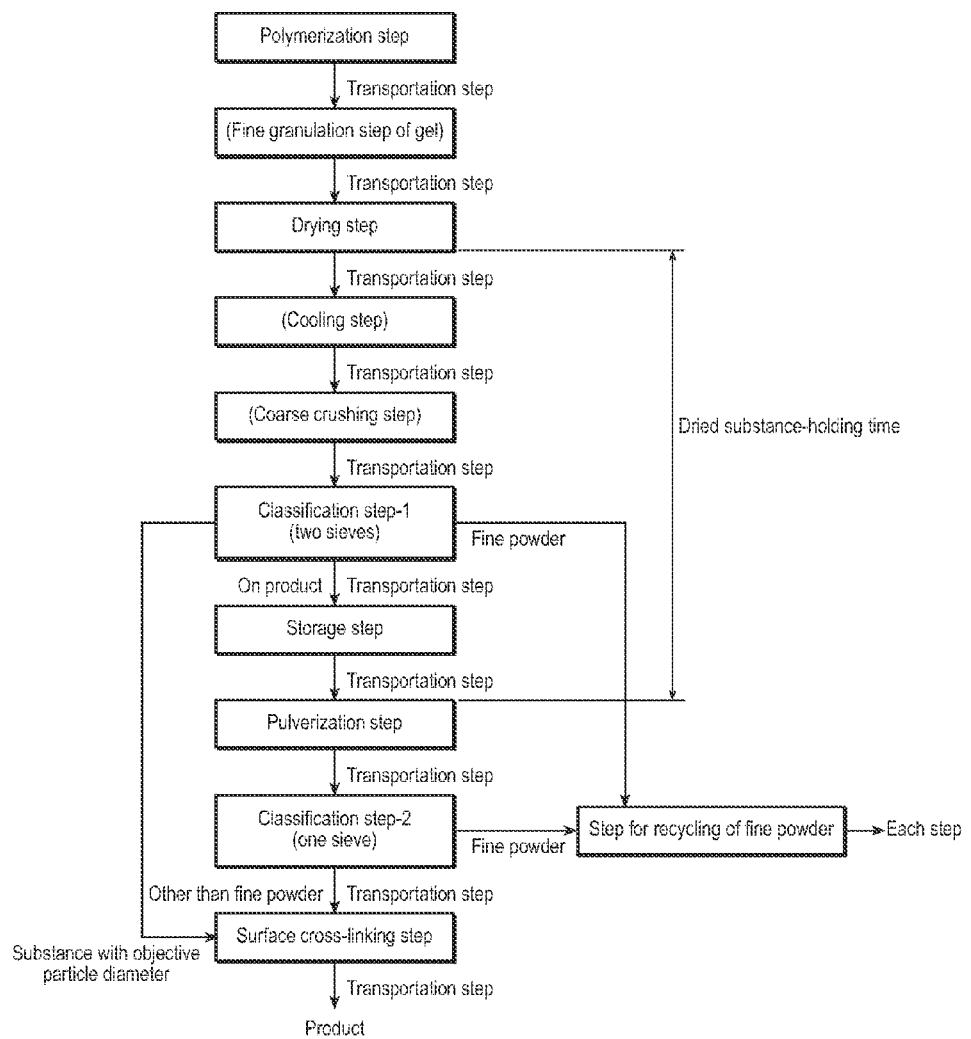
FIG. 10 is a schematic flow diagram showing a second production process relevant to an embodiment of the present invention.
Figure 11:
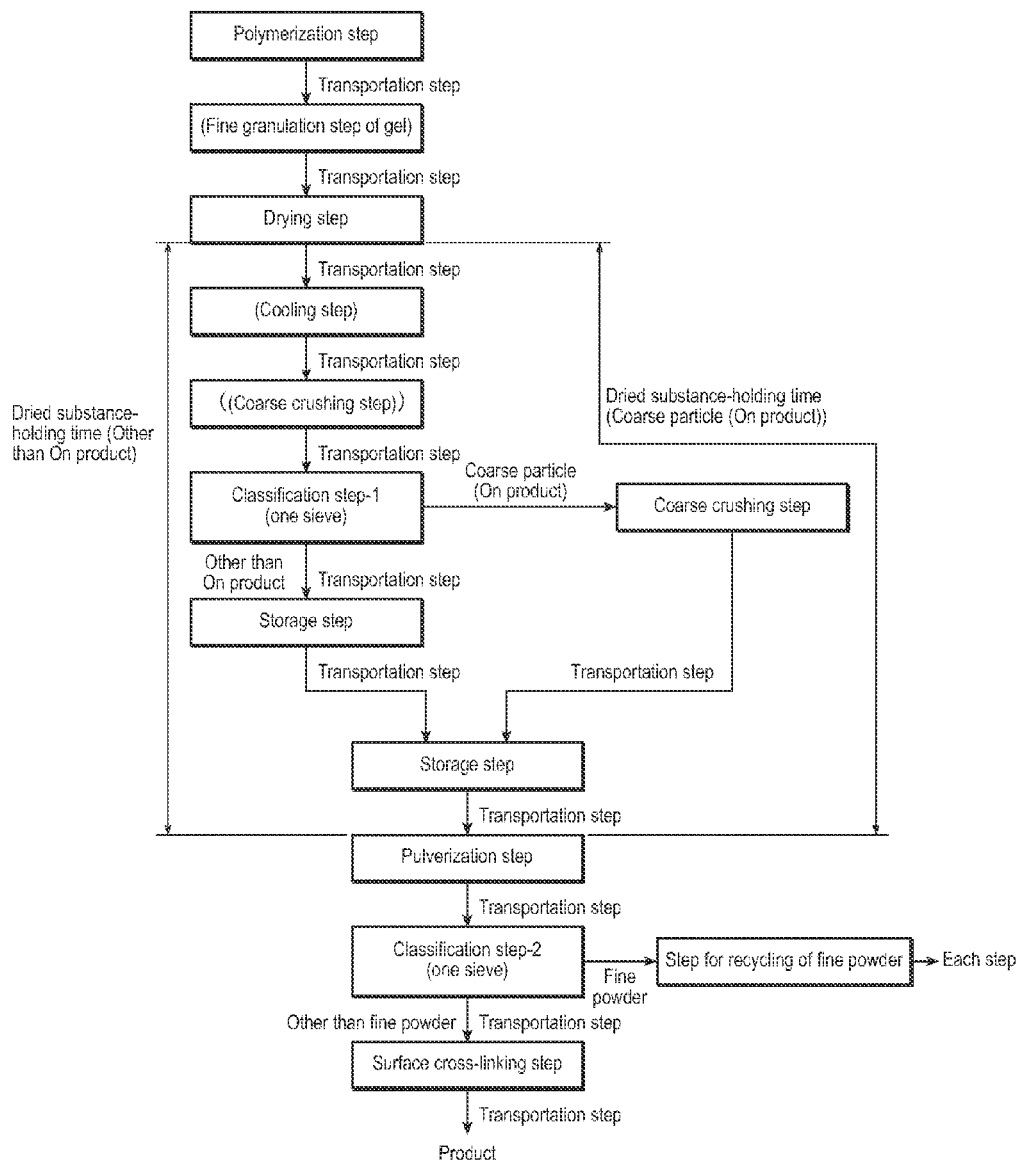
FIG. 11 is a schematic flow diagram showing a third production process relevant to an embodiment of the present invention.

An aggregated substance after drying may be classified, after converting to a particle state and before pulverization (corresponding to "Classification step-1" in FIG. 10). That is, it is preferable to perform further a classification step of dried substance before a pulverization step. Particles satisfying objective particle size by classification before pulverization may be sent to the next step (for example, a surface cross-linking step or the like), without being pulverized, by which load of pulverization or generation of fine powder accompanying with pulverization can be reduced.

In the case of performing classification, as needed, for example, it is enough to pulverize only particles with outside a desired particle diameter (for example, 850 μm or larger), by acquiring particles with a desired particle diameter (for example, one passing through 850 μm) by classification, as well as dried substance-holding time, which is essential in the present application, may be changed by each particle size, by classification using further sieves each having a mesh size of 2 to 10 mm, among particle diameter (particle size) other than the objective value, as needed. In general, a dried substance with large particle diameter can tend to have higher water content, and thus it is preferable to take longer dried substance-holding time.

In the classification performed, as needed, various classification apparatuses to be described later may be used. In this case, the classification step is performed under reduced pressure, or still more it is subjected to elimination of electricity.

(h) Storage Step

In the present invention, a dried substance is stored for a certain period. Residence time in the storage step is enough if the total time of residence time in the storage step and residence time in the transportation step is 3 minutes or longer which is a dried substance-holding time in the present application of 3 minutes or longer. When residence time in a transportation step is longer than a certain level depending on production amount or the like, residence time in the storage step may be set zero. The storage may be performed preferably for 1 second or longer, still more 5 seconds or longer, and particularly preferably 1 minute or longer. The upper limit of residence time in the storage step is not especially limited, however, in consideration of productivity, property or the like, it is preferably 300 minutes or shorter, and more preferably 60 minutes or shorter. In addition, by having such a storage step, dried substance-holding time can be controlled to a certain level or longer, as well as continuous production or continuous transportation can be stabilized. In addition, the storage step (in particular, a hopper) is preferably installed at the former stage and/or the latter stage of the transportation step, and the pneumatic transportation step is particularly preferably connected by the storage step (in particular, a hopper). An aspect of using a hopper in pneumatic transportation step is disclosed in, for example, US Publication No. 2007/0225160.

As conventional technology, a hopper or a storage method of a water-absorbent resin is described in U.S. Pat. No. 6,716,894 or FIG. 3 therein, U.S. Pat. No. 6,817,557 or FIG. 1 therein or the like. However, such patents do not suggest at all any problems of the present application or effect, still more a holding time after drying (or critical meaning of 3 minutes or longer thereof). That is, the holding time after drying is determined by time of the storage step or transportation step, however, such patents or drawings thereof do not state any of storing time nor transportation time at all. Still more, earlier PCT application, PCT/JP2009/054903, which has been filed by the present applicant and has not been published on the filing date of the present application (Mar. 31, 2009), also discloses a hopper, however, it has not suggested the present application similarly.

In the present invention, a hopper is suitably used for storage. The hopper is an apparatus for storing and managing a powder particle substance temporarily or for a long period, and a silo-like (longitudinally longer shape) one may be also included, as long as it is specified shape. The hopper having specified shape, which can be used in the present invention will be described (in FIG. 14) and below. In FIG. 14, reference number 1 shows exterior frame; 2 jacket; 3 steam tracing; 4 charging port; and 5 rotary valve, respectively.

As shape of hopper, in view of carrying property and transferring property of powder substance, in particular, a water-absorbent resin, a reversed truncated pyramid shape or a reversed circular truncated cone shape is preferably used in the present invention. A material thereof is not especially limited, however, one made of stainless steel is used preferably. A ratio of maximum diameter and height of the hopper may be in the range of 1/10 to 10/1, still more 1/3 to 3/1, and particularly 1/2 to 2/1. When the hopper does not have a cylindrical shape, it is specified by conversion to a diameter of a circle equivalent to the maximum cross-sectional area thereof. As for shape of reversed truncated pyramid shape or reversed circular truncated cone shape, as ratio of the reversed pyramid (or reversed circular cone) and the truncated part, a height of the truncated part is smaller than that of the reversed pyramid, and as for cross-section of hopper, it has home base shape, cross-section of the triangle part thereof is principle. That is, most of powder substance, preferably equal to or more than 50% by weight, and still more preferably equal to or more than 80% by weight, may be stored in a part of pyramid or circular cone of the hopper.

It is preferable to use a hopper having such a specified shape as an inclination angle of a cone part of equal to or larger than 45 degree, and a drawing rate of 0.3 to 0.8. The upper limit of the inclination angle of a cone part is 90 degree or lower, and still more below 90 degree. The "inclination angle of a cone part" is referred to as an inclination angle of a side wall surface relative to a horizontal surface of hopper installed. The inclination angle of a cone part of the hopper of the present invention is set at equal to or larger than 45 degree, preferably equal to or larger than 50 degree, more preferably 60 to 90 degree, particularly preferably 65 to 85 degree, and most preferably 70 to 85 degree.

In the case where the side wall surface is not flat, the inclination angle is specified by average value of angles determined from the whole side wall surface.

The drawing rate is a value of $(R2/R1) \times 100$, specified by a caliber of opening part of upper surface of hopper (maximum caliber part (R1) of upper part of hopper) and a caliber of bottom surface of hopper (caliber (R2) of discharge part of hopper). The drawing rate of the hopper is set at 30 to 80%, preferably 40 to 80%, more preferably 40 to 70%, and particularly preferably 45 to 65%. In the case where the caliber does not have a circle shape, for example, an ellipse or polygon shape, it is specified by converting to a circle equivalent to cross-sectional area thereof.

In the case where the inclination angle of cone part is over 90 degree or where the drawing rate is over 80%, or in the case where the inclination angle of cone part is below 45 degree or where the drawing rate is below 30%, property of the water-absorbent resin and stability thereof decrease significantly.

Although a (average) filling rate of water-absorbent resin inside the hopper may be 0% by volume, it is set at over 0% by volume and 90% by volume or less, preferably 10 to 80% by volume, still more preferably 30 to 80% by volume, and particularly preferably 40 to 80% by volume. The filling rate is specified by volume (%) of water-absorbent resin to be filled, relative to inner volume of hopper. By controlling it in the range, transfer property of water-absorbent resin can be improved. The filling rate outside of the above range, for example, over 90% by volume, would generate destruction of water-absorbent resin, which is not preferable.

In addition, inner volume of the hopper may be set at preferably 1 to 20 m$^3$, and more preferably 2 to 10 m$^3$.

(i) Temperature of Apparatus

In the present invention, a dried substance after the drying step is preferably transported or stored while warming or heating (the apparatus). In particular, in the transportation step, still more in the storage step, inner wall surface of a transportation machine is preferably maintained in a heated state and/or a warmed state from exterior side. As used herein, heating or warming indicates external heating or heat insulation of an interior surface of apparatus. When a temperature of water-absorbent resin to be transported or stored (for example, 70° C.) is lower than a temperature of apparatus (for example, 60° C.), it can be regarded as cooling of the water-absorbent resin (to 60° C.) in a sense. In the present invention, however, so long as the apparatus is warmed or heated, it is regarded as warming or heating, irrespective of temperature change of a water-absorbent resin. As explained in the above (h), U.S. Pat. No. 6,716,894 or FIG. 2 therein discloses an apparatus heated or warmed, however, does not suggest the present invention at all, as described above.

A temperature of inner wall surface is preferably in the order of 30 to 150° C., 30 to 100° C., 35 to 100° C., 40 to 90° C., 45 to 85° C., and 50 to 80° C. The temperature of inner wall surface below 30° C. would not provide effect by the present invention, while the temperature over 150° C. would not provide further effect than that obtained at 150° C. or lower, and thus setting at such high temperature would be economically disadvantageous. The temperature of inner wall surface may be adjusted so as not to decrease preferably by 20° C., and still more preferably by 10° C., relative to temperature of particulate water-absorbent resin. A temperature of particulate water-absorbent resin may be adjusted, in some cases, at room temperature or higher, for example, about 40 to 100° C., more preferably about 45 to 85° C., and particularly preferably about 50 to 80° C., to secure fluidity in handling particulate water-absorbent resin in an industrial scale. When the temperature of inner wall surface is lower than 20° C., relative to temperature of particulate water-absorbent resin, because the particulate water-absorbent resin in a warmed state is cooled at an inner wall surface of transportation machine, an aggregated substance would adhere on the inner wall surface, which may cause a trouble.

(j) Depressurization

In the present invention, for fluidity of dried substance or anti-caking, at least a part of storage step and transportation step is preferably set under reduced pressure. More preferably, 50% or more of required time from completion time of drying step to starting time of pulverization step is set in a reduced pressure state. That is, preferably, 50% or more of required processing time (dried substance-holding time) from a time of completing the drying step to a time of starting the pulverization step is set in a reduced pressure. In the case of using pneumatic transportation to be described later, pneumatic transportation may be performed under depressurization or pressurization. Depressurization and pressurization of pneumatic transportation are within the above range.

A "reduced pressure" means a state that pressure is lower than atmospheric pressure. In addition, a "degree of depressurization relative to atmospheric pressure" means pressure difference from atmospheric pressure, and is expressed by plus value in the case where pressure is lower than atmospheric pressure. For example, when atmospheric pressure is standard atmospheric pressure (101.3 kPa), the expression, "a degree of depressurization is 10 kPa", means that pressure is 91.3 kPa. In the present application, "degree of depressurization relative to atmospheric pressure" may be referred to simply "degree of depressurization" as well.

The lower limit of degree of depressurization is preferably over 0 kPa, more preferably 0.2 kPa or higher, and still more preferably 0.3 kPa or higher. In view of suppressing blowing up of powder inside a system, and in view of suppressing excessive cost for an exhaust gas apparatus, the upper limit of degree of depressurization is preferably 10 kPa or lower, more preferably 8 kPa or lower, and still more preferably 5 kPa or lower. A preferable range of degree of depressurization may be selected arbitrary between the above lower limit and the above upper limit.

(k) Difference from PATENT LITERATURES 1 to 26

Conventionally, as shown in the PATENT LITERATURE 10 (U.S. Pat. No. 6,817,557), pulverization was performed within as short period as possible after drying (within 10 minutes, in particular within 2 minutes), and a storage step, a classification step before pulverization (before roll mill pulverization), depressurization after drying, holding time or holding method varied depending large or small particle size, and the like have not been disclosed. Still more, in the above PATENT LITERATURES 1 to 26 and the like, including the PATENT LITERATURE 10, importance of dried substance-holding time on particle size has not been noticed at all. There has not been disclosed a constitution where dried substance-holding time is adjusted in a storage step and a transportation step, or a constitution where a step for holding a dried substance is performed under reduced pressure, or a constitution where different dried substance-holding times or different dried substance holding methods are used in a classification step of dried substance and before a pulverization step, depending each large or small particle size of the dried substance, or depending each water content.

(2-6) Pulverization Step

A dried substance is pulverized and classified to control particle diameter. In this case, 50% by weight or more of dried substance before pulverization is a particle with a particle diameter of 850 μm or larger. In addition, mass average particle diameter (D50) of dried substance before pulverization is not especially limited, however, it is preferably 4000 to 600 μm, and more preferably 3000 to 700 μm, and is set at the following particle diameter after the pulverization. In this way, particle diameter of the resultant particulate water-absorbent resin can be controlled efficiently and easily. These methods have been described, for example, in US Publication No. 2006/204755, however, in the present invention, by adding (2-5) dried substance-holding time, various pulverization methods can be used, and they should not be limited thereto.

Among these, in view of particle diameter control, an apparatus for pulverization by giving compression force or shear force to a particle by a plurality of rotating rolls, a roll-type pulverization machine selected from, for example, a roll mill or a roll granulator (for example, one manufactured by Matsubo Corp.) may be used suitably. The pulverization may be performed using single-stage or multi-stage, still more 2 to 5-stage roll mill or roll granulator. In this case, the pulverization machine is preferably warmed or heated as above, and still more in a depressurized state. In the coarse crushing as above, an apparatus other than roll mill or roll granulator is also used suitably, and for example, a pin mill rotating in low speed or high speed can be used. Preferably, the pulverization step is set under reduced pressure. As described above, although a pulverization machine is preferably warmed or heated, a pulverization temperature in this case is not especially limited, and temperature of dried substance to be supplied to the pulverization step can be adjusted so as to attain preferably 40 to 100° C., and more preferably at 50 to 90° C.

A size of pulverized substance pulverized in this way is not especially limited, and selected, as appropriate, in response to desired applications. A content of particles with a particle diameter of below 850 μm in pulverized substance is preferably 60% by weight or more, more preferably 70 to 99% by weight, still more preferably 75 to 97% by weight, and particularly preferably 80 to 95% by weight. In addition, a content of particles with a particle diameter of 150 μm or larger and below 850 μm in pulverized substance is preferably 75 to 99% by weight, more preferably 79 to 97% by weight, still more preferably 80 to 95% by weight, and particularly preferably 83 to 90% by weight. A weight average particle diameter (D50) of pulverized substance is not limited to the following, however, it ma be adjusted to preferably 200 to 700 μm, and more preferably 300 to 600 μm.

(2-7) Classification Step (Classification after Pulverization)

(a) Objective Particle Size

The particulate water-absorbent resin obtained by pulverization is preferably adjust, in the classification step, to have a mass average particle diameter (D50) of 200 to 600 μm, preferably 200 to 550 μm, more preferably 250 to 500 μm, and particularly preferably 350 to 450 μm. In the case of hygiene applications, it is usually subjected to surface cross-linking after that. The water-absorbent resin obtained by the classification step may be pulverized so that a content of particles with a particle diameter of 150 μm or larger and below 850 μm is preferably 80 to 99% by weight, and still more 90 to 99% by weight, when used in hygiene applications. If there are many fine particles passing through 150 μm, property would be lowered, which may lower pulverization efficiency to reduce fine powder to below 1%. Fine powder may be removed, as appropriate, and recycled as will be described later. In addition, the less content of particles below 150 μm is the better, and it is adjusted to usually 0 to 5% by weight, preferably 0 to 3% by weight, and particularly preferably 0 to 1% by weight. The less amount of particles with 850 μm or larger is the better, and it may be adjusted to usually 0 to 20% by weight, preferably 0 to 5% by weight, and particularly preferably 0 to 1% by weight. Fine powder which is generated in the pulverization step and separated in the classification step, may be recycled, as needed. In addition, large particles outside an objective range (for example, one having a particle diameter of 850 μm or larger) may be returned again to the pulverization step, however, a ratio thereof is 20% by weight or less, and preferably 10% by weight or less, so as not to increase load on a pulverizing machine. A particle size of particulate water-absorbent resin before surface cross-linking may be preferably applied to the one after surface cross-linking and still more to the final product, and classification may be performed again after surface cross-linking. In addition, a logarithm standard deviation (σζ) of particle size distribution is set at preferably 0.2 to 0.6, more preferably 0.2 to 0.5, further preferably 0.2 to 0.4, furthermore preferably 0.27 to 0.4, and most preferably 0.3 to 0.4. These measurement methods using standard sieves, for example, are described in WO 2004/069915 or EDANA-ERT420.2-02.

(b) Classification Method

A classification method for water-absorbent resin may be exemplified, for example, in the above PATENT LITERATURES 11 to 16, which can be suitably applied also to the present invention.

A classification apparatus to be used in the present invention is not especially limited, as long as it has a sieve classification screen surface, and is preferably a flat surface classification method, in particular, a tumble-type sieve classification apparatus. This sieve classification apparatus is typically vibrated, to support classification. The classification is preferably performed to such a degree that a product to be classified is introduced onto the sieve classification screen surface in a spiral state. The forced vibration may typically have a vibration width of 0.7 to 40 mm, and preferably 1.5 to 25 mm, and a vibration frequency of 1 to 100 Hz, and preferably 5 to 10 Hz.

(c) Elimination of Electricity in Classification

In the classification step, elimination of electricity is preferably performed. Elimination of electricity may be performed to at least one of a classification apparatus and a water-absorbent resin. Because these two are mutually contacted in the classification step, it is enough to eliminate electricity of any one of them. However, electricity of a sieve classification apparatus itself may be preferably eliminated.

As a method for electrical elimination, for example, the following methods (A) to (C) may be applied, however, it is not limited thereto. Leak current taken out in such electrical elimination is flown to the ground via grounding (earth) preferably shown by the following grounding resistance value.

(A) Antistatic brush: Electricity is eliminated from a sieve surface where static electricity generates (B) Ion generation brush: Electricity is eliminated by ion generation by applying high voltage (C) Grounding (earth): Static electricity generated in a rotation substance, a rotation axis, a rotation body, or an apparatus is eliminated.

When the (C) grounding is used, it is a method which comprises electrically connecting a building or a mount, where the apparatus is installed, with the ground showing the following earth resistance, to contact the charged substance with the apparatus, and to take out accumulated static electricity as leak current. Because this method is simple and the whole classification apparatus act as an electrical elimination apparatus, and thus provides high effects, it is one of the preferable methods for the water-absorbent resin.

The term "earth resistance" is referred to as a resistance value against current flowing from an earth electrode buried in the soil for grounding to the earth. As for a measurement method, the earth resistance may be measured using a commercially available earth resistance meter. A preferable range of the earth resistance is preferably equal to or lower than 100Ω, more preferably equal to or lower than 10Ω, and still more preferably equal to or lower than 5 Ω.

(d) Classification Under Reduced Pressure

The sieve classification operation may be performed with a water-absorbent resin under reduced pressure relative to circumference pressure, preferably in a state of the depressurization state as mentioned above, to enhance property after surface cross-linking.

(e) Air Flow

Preferably onto a water-absorbent resin, gas flow, particularly preferably air may be passed through during classification. Particularly preferably, gas flow is heated before filling in a sieve classification apparatus, typically at least to 40° C., preferably at least to 50° C., further preferably at least to 60° C., still more preferably at least to 65° C., and particularly preferably at least to 70° C. Temperature of gas flow is usually lower than 120° C., preferably lower than 110° C., further preferably lower than 100° C., still more preferably lower than 90° C., and particularly preferably lower than 80° C.

In addition, also in the coarse crushing step, the classification step, the storage step, or the pulverization step of dried substance, it is similarly preferable to have gas flow pass onto a water-absorbent resin.

(2-8) Step for Recycling of Fine Powder

Fine powder, which generates in a pulverization step or a classification step and contains particles having a particle diameter below 150 μm as a main component (particularly 70% by weight or more, and still more 90% by weight or more), would decrease property of a water-absorbent resin, as well as raise a problem in terms of safety and hygiene. Accordingly, fine powder may be preferably removed by classification.

The fine powder may be recovered, as appropriate, molded to a particulate form again, or recovered (recycled) into an aqueous solution of a monomer or a polymer gel. As a recycling method for fine powder, fine powder can be added to a step for producing a water-absorbent resin, such as a polymerization step, a pulverization step of gel, a drying step, which is shown in the above PATENT LITERATURES 22 to 26.

The production step for recycling may be the same production line as one which classified fine powder, or may be another production line. Recycling amount of fine powder may be determined, as appropriate, in about, for example, 1 to 30% by weight, still more 5 to 25% by weight, and particularly 8 to 20% by weight, relative to production amount.

(2-9) Surface Cross-Linking Step

In the present invention, a water-absorbent resin obtained by the (2-7) classification step can be converted to a water-absorbent resin more suitable for hygiene material applications, via a surface cross-linking step which has been known conventionally. The surface cross-linking is to provide a part with higher cross-link density at a surface layer of the water-absorbent resin (surface vicinity; usually around several 10 μm from the surface of water-absorbent resin), which may be formed by radical cross-linking at the surface or surface polymerization, a cross-linking reaction with a surface cross-linking agent or the like.

As the surface cross-linking agent which can be used in the present invention, various organic or inorganic surface cross-linking agents can be exemplified. In view of property or easy handling, a cross-linking agent capable of reacting with a carboxyl group may be preferably used. For example, polyhydric alcohol compounds, epoxy compounds, polyvalent amine compounds or condensed compounds thereof with a halo-epoxy compound, oxazoline compounds, mono-, di-, or poly-oxazolidinone compounds, polyvalent metal salts, and alkylene carbonate compounds or the like may be cited.

More specifically, compounds exemplified in U.S. Pat. No. 6,228,930, U.S. Pat. No. 6,071,976 and U.S. Pat. No. 6,254,990 may be included. For example, polyhydric alcohol compounds such as mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerin, polyglycerin, 2-buten-1,4-diol, 1,4-butanediol, 1,3-butanediol, 1,5-pentanediol, 1,6-hexanediol, 1,2-cyclohexanedimethanol or the like; epoxy compounds such as ethylene glycol diglycidyl ether, glycidol or the like; polyvalent amine compounds such as ethylene diamine, diethylenetriamine, triethylenetetramine, tetraethylene pentamine, pentaethylene hexamine, polyethylene imine, polyamide polyamine or the like; haloepoxy compounds such as epichlorohydrin, epibromohydrin, α-methylepichlorohydrin or the like; condensates of the polyvalent amine compound and the haloepoxy compound; oxazolidinone compounds such as 2-oxazolidinone or the like; alkylene carbonate compounds such as ethylene carbonate or the like; oxetane compounds; cyclic urea compounds such as 2-imidazolidinone or the like may be cited. However, they should not be limited especially.

Use amount of the surface cross-linking agent is preferably within the range of 0.001 to 10 parts by weight, and more preferably within the range of 0.01 to 5 parts by weight, relative to 100 parts by weight (parts by mass) of water-absorbent resin particle, although it depends on a compound used or combination thereof. In the present invention, water may be used with the surface cross-linking agent. In this case, amount of water used is in the range of preferably 0.5 to 20 parts by weight, and more preferably 0.5 to 10 parts by weight, relative to 100 parts by weight of water-absorbent resin particle. In the present invention, a hydrophilic organic solvent may be used other than water, and use amount thereof may be 0 to 10 parts by weight, and more preferably 0 to 5 parts by weight, relative to 100 parts by weight of water-absorbent resin particle. In addition, in mixing the surface cross-linking agent solution with a water-absorbent resin particle, a water-insoluble fine particle powder substance or a surfactant may be present together in an amount in the range not to obstruct effect by the present invention, for example, 0 to 10% by weight or less, preferably 0 to 5% by weight, and more preferably 0 to 1% by weight. A preferable surfactant or a use method thereof may be exemplified, for example, in U.S. Pat. No. 7,381,775.

A water-absorbent resin after mixed with the surface cross-linking agent may be preferably subjected to heat treatment and then cooling treatment, as needed. A heating temperature may be in the range of 70 to 300° C., preferably 120 to 250° C., more preferably 150 to 250° C. In addition, a heating time may be preferably within the range of 1 to 120 minutes. Heat treatment may be performed in a usual drying machine or a heating furnace.

The addition of a surface cross-linking agent may be performed by various methods. A method which comprises mixing a surface cross-linking agent with water and/or a hydrophilic organic solvent, and then mixing the resultant mixture with a particulate water-absorbent resin by spraying or dropping may be preferably used, and a method for spraying may be more preferably used.

As another embodiment of surface cross-linking treatment in the present invention, a method which comprises adding a treatment liquid containing a radically polymerizable compound to a particulate water-absorbent resin, and then irradiating activated energy for surface cross-linking treatment, which is described, for example, in U.S. Pat. No. 7,201,941, may be cited. In addition, surface cross-linking treatment can be performed by adding a surfactant to the treatment liquid, and then irradiating activated energy. Still more, as other embodiment of surface cross-linking treatment in the present invention, there may be included a method which comprises adding an aqueous solution containing a peroxide radical initiator to a particulate water-absorbent resin, and then heating for surface cross-linking treatment, which is described, for example, in U.S. Pat. No. 4,783,510.

(2-10) Liquid Permeability Enhancing Agent

To a particulate water-absorbent resin obtained by a production method of a water-absorbent resin of the present invention, a liquid permeability enhancing agent is preferably added at the same time, before or after surface cross-linking. By the addition of liquid permeability enhancing agent, a particulate water-absorbent resin results in having a layer of liquid permeability enhancing agent. In this way, a particulate water-absorbent resin can have improved liquid permeability.

As the liquid permeability enhancing agent, polyamine, a polyvalent metal salt, or a water-insoluble fine particle may be exemplified, and in particular, polyvalent metal salts such as aluminum sulfate, in particular, water-soluble polyvalent metal salts may be preferably cited. Technology described in U.S. Pat. No. 7,179,862, EP Patent No. 1165631, U.S. Pat. No. 7,157,141, U.S. Pat. No. 6,831,142, US Publication No. 2004/176557, US Publication No. 2006/204755, US Publication No. 2006/73969, US Publication No. 2007/106013 can be applied. Typical examples of the polyamine or water-insoluble fine particle can be found in WO 2006/082188, WO 2006/082189, WO 2006/082197 or the like.

Use amount of the liquid permeability enhancing agent is preferably within the range of 0.001 parts by weight to 5 parts by weight, and more preferably within the range of 0.01 to 1 part by weight, relative to 100 parts by weight of a particulate water-absorbent resin. The use amount of the liquid permeability enhancing agent within the above range is capable of enhancing absorbency against pressure (AAP) and Saline Flow Conductivity (SFC) of particulate water-absorbent resin.

As for the addition of the liquid permeability enhancing agent, a method which comprises mixing it with water and/or a hydrophilic organic solvent, in advance, and then mixing to a particulate water-absorbent resin by spraying or dropping can be preferably used, and a method for spraying may be more preferably used. The addition of liquid permeability enhancing agent may be preferably performed in the cooling step inside a fluidized bed of a particulate water-absorbent resin.

(2-11) Other Substances Added to Particulate Water-Absorbent Resin

A particulate water-absorbent resin may be added and mixed with a lubricating agent, a chelating agent, a deodorizer, an anti-microbe agent, water, a surfactant, a water-insoluble fine particle, an antioxidant, a reducing agent or the like, in an amount of about 0 to 30%, and still more about 0.01 to 10%, relative to the particulate water-absorbent resin, during polymerization or after polymerization. The chelating agent which may be used suitably may be exemplified in U.S. Pat. No. 6,599,989, WO 2008/090961 or the like, while the surfactant or the lubricating agent may be exemplified in U.S. Pat. No. 6,107,358, U.S. Pat. No. 7,473,739 or the like.

In the case of adding and mixing after polymerization, the adding and mixing may be performed before drying, after drying, before pulverization, or after pulverization. A particulate water-absorbent resin may be added with other substances, as long as they do not inhibit properties of water-absorbent resin. A method for adding other substances should not be especially limited. Even in the case where a water-absorbent resin contains a small amount (for example, over 0 to 30% by weight) of the additives, that is, in the case of a water-absorbent resin composition, it is collectively called a water-absorbent resin.

[3] Property of Particulate Water-Absorbent Resin

In the case of aiming at hygiene materials, in particular, disposable diapers, at least one of the following (3-1) to (3-6), and still mote two or more, in particular three or more including AAP may be preferably controlled by the polymerization or surface cross-linking. The case of not satisfying the following would not exert sufficient performance in a high concentration diaper to be described later.

(3-1) Initial Coloring

The water-absorbent resin is superior in initial coloring and, for example, in Hunter Lab surface color system, L value (Lightness) is preferably 85 or higher, more preferably 87 or higher, and still more preferably 89 or higher; b value is −5 to 10, more preferably −5 to 5, and still more preferably −4 to 4; and a value is −2 to 2, at least −1 to 1, preferably −0.5 to 1, and most preferably 0 to 1. YI is 10 or lower, still more preferably 8 or lower, and particularly preferably 6 or lower; and WB is 70 or higher, still more preferably 75 or higher, and particularly preferably 77 or higher. Still more, the water-absorbent resin is superior in time course coloring and shows sufficient whiteness degree, even in high temperature and high humidity conditions, which is an acceleration test (model) for a long period of storage.

(3-2) AAP (Absorbency Against Pressure)

To prevent leakage from disposable diapers, by using the polymerization as an example of an attaining means, absorbency (AAP) can be controlled to preferably 20 [g/g] or higher, more preferably 22 [g/g] or higher, and still more preferably 24 [g/g] or higher, which is specified by ERT and measured under pressure of 1.9 kPa, and under pressure of 4.8 kPa, for an aqueous 0.9% by weight sodium chloride solution.

(3-3) SFC (Saline Flow Conductivity)

To prevent leakage from disposable diapers, by using the polymerization as an example of an attaining means, SFC, which is Flow Conductivity in an aqueous 0.69% sodium chloride solution, as liquid permeability under pressure, can be controlled to 1 [$\times 10^{-7} \cdot cm^3 \cdot s \cdot g^{-1}$] or higher, preferably 10 [$\times 10^{-7} \cdot cm^3 \cdot s \cdot g^{-1}$] or higher, more preferably 50 [$\times 10^{-7} \cdot cm^3 \cdot s \cdot g^{-1}$] or higher, still more preferably 70 [$\times 10^{-7} \cdot cm^3 \cdot s \cdot g^{-1}$] or higher, and particularly preferably 100 [$\times 10^7 \cdot cm^3 \cdot s \cdot g^{-1}$] or higher.

(3-4) CRC (Absorbency Against Non-Pressure)

Absorbency against non-pressure (CRC) specified by ERT can be controlled to preferably 10 [g/g] or higher, more preferably 20 [g/g] or higher, still more preferably 25 [g/g] or higher, and particularly preferably 30 [g/g] or higher. The higher CRC is the better, and the upper limit value is not especially limited. In view of balance of other properties, it is preferably 50 [g/g] or lower, more preferably 45 [g/g] or lower, and still more preferably 40 [g/g] or lower.

(3-5) Ext (Water-Soluble Content)

Water-soluble content specified by ERT can be controlled to preferably 0 to 35% by weight or lower, more preferably 25% by weight or lower, still more preferably 15% by weight or lower, and particularly preferably 10% by weight or lower.

(3-6) Residual Monomers

Using the polymerization as an example of an attaining means, content of residual monomers specified by ERT is usually 500 ppm or lower, preferably 0 to 400 ppm, more preferably 0 to 300 ppm, and particularly preferably 0 to 200 ppm.

(3-6) Water Content

In view of water-absorbing rate or impact resistance, it can be preferably adjusted so that a predetermined amount (for example; a water content of 0.1 to 10% by weight, and still more 1 to 8% by weight) of water remains. Water content is specified by a method of Example.

[4] Applications of Particulate Water-Absorbent Resin

Applications of the water-absorbent resin of the present invention are not especially limited. It can be used in absorbent articles such as disposable diapers, sanitary napkins, incontinent pads, and the like. In particular, it can be used in high concentration diapers (those using a large quantity of a water-absorbent resin in one piece of the diaper), which have conventionally had a problem of smelling, coloring or the like derived from raw materials. Particularly when it is used in an upper layer part of absorbing body in the absorbent article, particularly superior performance can be exerted.

Effects by the present invention can be exerted when a content of water-absorbent resin in an absorbing body in the absorbing article (core concentration) is 30 to 100% by weight, preferably 40 to 100% by weight, more preferably 50 to 100% by weight, still more preferably 60 to 100% by weight, particularly preferably 70 to 100% by weight, and most preferably 75 to 95% by weight.

EXAMPLES

Explanation will be given below in more detail on the present invention with reference to Production Examples, Examples and Comparative Examples. The present invention should not be limited thereto. Examples obtained by combining, as appropriate, with technical means shown each in different Examples, are also encompassed in the scope of the present invention.

Electric equipments used in Examples were all used in 200 V or 100 V, unless otherwise specified. Further, a water-absorbent resin was used under condition of 25±2° C., and a relative humidity of 50% RH, unless otherwise specified. A reagent or device exemplified in the following measurement methods, Production Examples, Examples and Comparative Examples, may be substituted with equivalent one, as appropriate.

[Measurement Methods for Properties]

<Particle Diameter>

A particle diameter distribution and weight average particle diameter (D50) were measured by passing a sample through a standard sieve, as will be explained below.

As for a measurement method for particle diameter distribution of pulverized substance, 10.0 g of the pulverized substance was put on JIS standard sieves (THE IIDA TESTING SIEVE: diameter 8 cm), each having a mesh size of 850 μm, 710 μm, 600 μm, 500 μm, 425 μm, 300 μm, 212 μm, 150 μm, and 45 μm, at room temperature (20 to 25° C.) and a relative humidity of 50% RH, and classified for 5 minutes using a sieve shaker (IIDA SIEVE SHAKER, TYPE: ES-65 model, SER. No. 0501).

As for a measurement method for particle diameter distribution of dried substance, 300 g of the dried substance was put on JIS standard sieves (THE IIDA TESTING SIEVE: diameter 20 cm), each having a mesh size of 9.5 mm, 8.0 mm, 5.6 mm, 4.75 mm, 3.35 mm, 2.8 mm, 2.0 mm, 1.0 mm, 0.6 mm, at room temperature (20 to 25° C.) and a relative humidity of 50% RH, and classified for 10 minutes using a Ro-Tap-type shaker.

As for a measurement method for particle diameter distribution of particulate hydrogel, about 300 g of the particulate hydrogel was put in a polyethylene bag, and then added with 1 g of Aerozil R-972 (hydrophobic fine particulate silicon oxide, produced by Nippon Aerozil Co., Ltd.) and mixed by shaking to crush sufficiently. The resultant particulate hydrogel polymer was put on JIS standard sieves (THE IIDA TESTING SIEVE: diameter 20 cm), each having a mesh size of 9.5 mm, 8.0 mm, 5.6 mm, 4.75 mm, 3.35 mm, 2.8 mm, 2.0 mm, 1.0 mm, 0.85 mm, at room temperature (20 to 25° C.) and a relative humidity of 50% RH, and classified for 10 minutes using a Ro-Tap-type shaker.

As for a measurement method for particle diameter distribution of particulate hydrogel, any of the following two methods was used. Which one was used will be described later. The following dry-type method is effective in measuring a particulate hydrogel having a water content below 35% by weight, while the wet-type method is effective in measuring a particulate hydrogel having a water content of 35% by weight or higher.

(1) Dry-type method (used in Production Examples 1, 2 and 4): About 300 g of the particulate hydrogel was put in a polyethylene bag, and then added with 1 g of Aerozil R-972 (hydrophobic fine particulate silicon oxide, produced by Nippon Aerozil Co., Ltd.) and mixed by shaking to crush sufficiently. The resultant particulate hydrogel polymer was put on JIS standard sieves (THE IIDA TESTING SIEVE: diameter 20 cm), each having a mesh size of 9.5 mm, 8.0 mm, 5.6 mm, 4.75 mm, 3.35 mm, 2.8 mm, 2.0 mm, 1.0 mm, 0.85 mm, at room temperature (20 to 25° C.) and a relative humidity of 50% RH, and classified for 10 minutes using a Ro-Tap-type shaker.

(2) Wet-type method (used in Production Example 3): The measurement was performed in accordance with a method described in JP Patent No. 3175790. That is, 25 g of the particulate hydrogel-like polymer sampled (solid content: α% by weight) was charged into 1200 g of an aqueous solution of 20% by weight of sodium chloride, and the resultant mixture was stirred for 60 minutes under rotation of a stirrer chip at 300 rpm. After completion of the stirring, the dispersion was charged on sieves (each having a mesh size of 9.5 mm, 8.0 mm, 4.0 mm, 2.0 mm, 0.85 mm, 0.60 mm, 0.30 mm, 0.075 mm), onto which 6000 g of an aqueous solution of 20% by weight of sodium chloride was slowly poured, to classify the particulate hydrogel-like polymer. The particulate hydrogel-like polymer classified on each of the sieves was rinsed sufficiently, and weighed [w (g)]. Mesh size [γ (mm)] of the sieve was converted to a mesh size R(100) of the sieve equivalent to a solid content of 100% by weight of the particulate hydrogel-like polymer, according to the following EXPRESSION 1. Particle size distribution of the particulate hydrogel-like polymer, equivalent to the solid content of 100% by weight, that is, in dry conversion, was plotted on a logarithmic probability paper.

[EXPRESSION 1]

$$R(100)(mm) = \sqrt[3]{\frac{\alpha}{100} \times \frac{25}{w}} \times \gamma(mm) \quad \text{EXPRESSION 1}$$

Weight average particle diameter (D50) means a particle diameter of standard sieve corresponding to 50% by weight of the whole particles, among the standard sieves each having certain mesh size, as described in U.S. Pat. No. 5,051,259. By using particle diameter distributions of the particulate water-absorbent resin, the dried substance and the particulate hydrogel, obtained by the above measurement method for particle diameter distribution, residual percentage (R) of each particle diameter was plotted on a logarithmic probability paper. In this way, weight average particle diameter (D50) was read from particle diameter equivalent to R=50%.

<Water Content>

On a 6-cm aluminum dish, 1 g of a particulate hydrogel or a particulate water-absorbent resin was spread thinly, and dried for 3 hours in a calm oven at 180° C., to measure masses thereof before drying and after drying, which were substituted into the following EXPRESSION to measure a water content (%). A solid content (%) was specified by (100−water content) (%).

[EXPRESSION 2]

$$\text{Water content (\%)} = \frac{\text{(Weight before drying (g))} - \text{(Weight after drying (g))}}{\text{(Weight before drying (g))}} \times 100 \quad \text{EXPRESSION 2}$$

Production Example 1

By continuously supplying into a mixer an aqueous solution of 48.5% by weight of sodium hydroxide at a flow rate of 9.7 g/s, acrylic acid at a flow rate of 12.1 g/s, a mixed solution of an aqueous solution of 30% by weight of polyethylene glycol diacrylate (average molecular weight 523) (flow rate 0.0203 g/s) and an aqueous solution of 46% by weight of diethylenetriamine pentaacetic acid trisodium salt (flow rate 0.0016 g/s) at a flow rate of 0.0219 g/s, and water at a flow rate of 5.286 g/s, an aqueous solution of a monomer was prepared. In this case, a temperature of the aqueous solution of a monomer was 103° C.

Into the aqueous solution of a monomer thus prepared, an aqueous solution of 1.0% by weight sodium persulfate was further added at a flow rate of 0.589 g/s, and then the aqueous solution of a monomer was continuously supplied on an endless belt running at 230 cm/m and warmed at about 100° C. The aqueous solution of a monomer continuously supplied on the belt quickly initiated polymerization, to provide a band-like hydrogel sheet (hydrogel-like polymer).

The hydrogel sheet was continuously granulated finely using a cutter mill having a screen with a diameter of 6 mm (trade name: "RC250", manufactured by Yoshiko Ltd., Co.). In this way, a particulate hydrogel (a) with a size of about 1 to 3 mm and a temperature of about 35° C. was obtained. In this case, water content of the particulate hydrogel (a) was 29% by weight. A particle diameter distribution of the particulate hydrogel (a) was measured by a dry-type method to find that weight average particle diameter (D50) was 2.0 mm, ratio of gel particle having a particle diameter of 3 mm or larger was 12.2% by weight, relative to total weight of the particulate hydrogel (a), and ratio of gel particle having a particle diameter below 850 μm was 7.3% by weight, relative to total weight of the particulate hydrogel (a).

Example 1

The particulate hydrogel (a) obtained in the Production Example 1 was continuously charged to a conduction flow drying machine (a fluid-bed drying machine, trade name: "FCA-2", manufactured by Okawara Corp., having ratio of a fluid-bed length of 850 mm/a fluid-bed width of 240 mm of 3.54), which had been set at a hot air temperature of 140° C., and a air velocity of 2.4 m/s. Then, by drying it so as to attain a residence time of 23 minutes, a dried substance (b) was obtained continuously. The dried substance (b) had a water content of 11.0% by weight, a weight average particle diameter (D50) of 1.7 mm and a ratio of particles having a particle diameter below 850 μm of 10.3% by weight. In addition, the dried substance (b) contained gel particle having a particle diameter of 3 mm or larger in an amount of 2.3% by weight, relative to total weight of the dried substance (b).

3 kg of the dried substance (b) was sampled at the exit of the drying machine, and quickly charged into a hopper wound with an electric heater at the circumference, by pneumatic transportation. The hopper was adjusted in advance to have an inner wall temperature of 80° C. After a certain time later, the dried substance (b) was drawn from a rotary valve at the lower part of the hopper, charged to a roll mill (trade name: "RM-16", manufactured by Asano Ironwork Co., Ltd., one-stage type), and subjected to pulverization at a treatment speed of 200 kg/hr, to obtain a pulverized substance (A1) using the roll mill. A clearance of the roll had been adjusted at 0.3 mm. In addition, the dried substance (b) on the roll mill was pulverized quickly (within 5 seconds) after charging, and taken out from the roll mill. In this case, a time required in pneumatic transportation was several seconds, provided that a time when the dried substance came out from the drying machine was regarded as 0 minute, residence time in the hopper was adjusted at 5 minutes, and total time of pneumatic transportation and residence time in the hopper is used as a dried substance-holding time, which is shown in FIG. 2. A water content of the dried substance does not change at the exit of the drying machine and the inlet of the pulverization machine, and temperature of the dried substance was measured to be 85° C. at the exit of the hopper. A temperature of the inner wall of the hopper was measured by attaching a thermocouple thermometer (K-line) at the inner wall. In addition, a temperature of the dried substance was measured by sampling the dried substance at the exit of the hopper and quickly inserting a contact-type thermometer thereinto.

The pulverized substance (A1) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (5 minutes) and ratio (% by weight) of particles having a particle diameter of 150 μm or larger and below 850 μm of the roll mill-pulverized substance (A1) is shown in the following Table 1 and FIG. 2.

Examples 2 to 7

Roll mill-pulverized substances (A2 to A7) were obtained, by performing similar operation as in Example 1, except that residence time in the hopper in Example 1 was changed from 5 minutes (Example 1) to 10 minutes (Example 2), 15 minutes (Example 3), 20 minutes (Example 4), 25 minutes (Example 5), 30 minutes (Example 5) and 80 minutes (Example 7). A temperature of the dried substance to be subjected to pulverization was 76 to 85° C. Further, a water content of the dried substance does not change during the residence time in the hopper.

The pulverized substances (A2 to A7) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the roll mill-pulverized substance (A2 to A7) is shown in the following Table 1 and FIG. 2.

Comparative Example 1

A roll mill-pulverized substance (A8) was obtained, by performing similar operation as in Example 1, except that the dried substance (b) coming out from the exit of the drying machine was quickly (dried substance-holding time below 1 minute) was charged into the roll mill to be subjected to pulverization. In pulverization of the dried substance (b) with the roll mill, the roll mill generated abnormal sound in pulverization, and many flat-shaped particles crushed with the roll were observed in the pulverized substance.

The pulverized substance (A8) thus obtained was classified using sieves each having a mesh size of 850 μm and 150 μm, to measure a ratio (% by weight) of particulate water-absorbent resin having a particle diameter of 150 μm or larger and below 850 μm. A ratio (% by weight) of particles having a particle diameter of 150 μm or larger and below 850 μm of the pulverized substance (A8) at dried substance-holding time (0 minute) is shown in the following Table 1 and FIG. 2.

TABLE 1

|  | Comparative Example 1 | Example 1 | Example 2 | Example 3 | Example 4 | Example 5 | Example 6 | Example 7 |
|---|---|---|---|---|---|---|---|---|
| Roll mill-pulverized substance | A8 | A1 | A2 | A3 | A4 | A5 | A6 | A7 |
| Dried substance-holding time [min] | 0 | 5 | 10 | 15 | 20 | 25 | 30 | 80 |
| Particle diameter distribution |  |  |  |  |  |  |  |  |
| 850 μm on [wt %] | 29.8 | 20.5 | 16.1 | 15.1 | 14.6 | 14.6 | 11.9 | 7.8 |
| 850 μm pass [wt %] | 70.2 | 79.6 | 83.9 | 84.9 | 85.4 | 85.4 | 88.1 | 92.2 |
| 150 μm pass [wt %] | 3.6 | 4.1 | 4.8 | 4.2 | 3.6 | 2.9 | 4.0 | 2.8 |
| 150 μm or larger and below 850 μm [wt %] | 66.6 | 75.4 | 79.1 | 80.7 | 81.8 | 82.5 | 84.1 | 89.4 |

From the results in the Table 1 and FIG. 2, it is noted that by setting dried substance-holding time at three minutes or longer, a ratio of particles having a particle diameter of 150 μm or larger and below 850 μm can be increased significantly. In addition, it is also noted that a particle diameter of the pulverized substance became small and a yield of particles having a preferable particle size (150 μm or larger and below 850 μm) increased, after 5 minutes, still more after 10 minutes, and still more after 15 minutes, as compared with just after the dried substance (b) came out from a drying machine.

Production Example 2

By continuously supplying into a mixer an aqueous solution of 48.5% by weight of sodium hydroxide at a flow rate of 9.7 g/s, acrylic acid at a flow rate of 12.1 g/s, a mixed solution of an aqueous solution of 30% by weight of polyethylene glycol diacrylate (average molecular weight 523) (flow rate 0.0879 g/s) and an aqueous solution of 46% by weight of diethylenetriamine pentaacetic acid trisodium salt (flow rate 0.0016 g/s) at a flow rate of 0.0895 g/s, and water at a flow rate of 5.286 g/s, an aqueous solution of a monomer was prepared. In this case, a temperature of the aqueous solution of a monomer was 95° C.

Into the aqueous solution of a monomer thus prepared, an aqueous solution of 1.0% by weight sodium persulfate was further added at a flow rate of 0.589 g/s, and then the aqueous solution of a monomer was continuously supplied on an endless belt running at 200 cm/m and warmed at about 100° C. The aqueous solution of a monomer continuously supplied on the belt quickly initiated polymerization, to provide a band-like hydrogel sheet (hydrogel-like polymer).

The hydrogel sheet was continuously granulated finely using a cutter mill having a screen with a diameter of 12 mm (trade name: "RC250", manufactured by Yoshiko Ltd., Co.). In this way, a particulate hydrogel (c) with a size of about 1 to 4 mm and a temperature of about 40° C. was obtained. In this case, water content of the particulate hydrogel (c) was 30% by weight. A particle diameter distribution of the particulate hydrogel (c) was measured by a dry-type method to find that weight average particle diameter (D50) was 2.9 mm, ratio of gel particle having a particle diameter of 3 mm or larger was 42.2% by weight, relative to total weight of the particulate hydrogel (c), and ratio of gel particle having a particle diameter below 850 μm was 4.2% by weight, relative to total weight of the particulate hydrogel (c).

Example 8

Onto a metal screen with a length of 27 cm, a width of 18 cm, and 20 mesh, 500 g of the particulate hydrogel (c) obtained in the Production Example 2 was deposited in a thickness of about 30 mm, and dried at 180° C. for 20 minutes using a hot-air drying machine (trade name: "through-flow batch-type drying machine 71-S6 model", manufactured by Satake Chemical Equipment Mfg. Ltd.). The resultant dried substance (d) had a water content of 6% by weight, and aggregated slowly to provide a block state.

The dried substance (d) was taken out from the drying machine, stored in a container made of foamed polystyrene, and at 3 minutes after taking out from the drying machine (that is, dried substance-holding time=3 minutes), pulverized by passing one time through a roll mill (WML-type roll mill pulverization machine, manufactured by Inokuchi Giken Ltd., Co.), whose roll clearance was set at 0.3 mm, in a speed of 1 kg/m. Temperature of the dried substance to be subjected to pulverization was 95° C.

The pulverized substance (B1) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (3 minutes) and ratio (% by weight) of particles having a particle diameter of 150 μm or larger and below 850 μm of the roll mill-pulverized substance (B1) is shown in the following Table 2 and FIG. 3.

Examples 9 to 12

Roll mill-pulverized substances (B2 to B5) were obtained by performing similar operation as in Example 8, except that dried substance holding time, from taking out of the drying machine to pulverization using a roll mill, of the dried substance (d) in Example 8 was changed from 3 minutes (Example 8) to 4 minutes (Example 9), 5 minutes (Example 10), 7 minutes (Example 11), and 9 minutes (Example 12).

The pulverized substances (B2 to B5) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the roll mill-pulverized substance (B2 to B5) is shown in the following Table 2 and FIG. 3. A temperature of the dried substance to be subjected to pulverization was in the range of 91 to 95° C.

Comparative Examples 2 to 4

Roll mill-pulverized substances (B6 to B8) were obtained, by performing similar operation as in Example 8, except that time from taking out of the drying machine to pulverization using a roll mill of the dried substance (d) in Example 8 was changed from 3 minutes (Example 8) to 0.7 minute (Comparative Example 2), 1 minute (Comparative Example 3), and 2 minutes (Comparative Example 4). In pulverization of the dried substance (d) with the roll mill, the roll mill generated abnormal sound. A temperature of the dried substance to be subjected to pulverization was in the range of 94 to 97° C.

The pulverized substances (B6 to B8) thus obtained were classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the resultant pulverized substances (B6 to B8) is shown in the following Table 2 and FIG. 3.

TABLE 2

|  | Comparative Example 2 | Comparative Example 3 | Comparative Example 4 | Example 8 | Example 9 | Example 10 | Example 11 | Example 12 |
|---|---|---|---|---|---|---|---|---|
| Roll mill-pulverized substance | B6 | B7 | B8 | B1 | B2 | B3 | B4 | B5 |
| Dried substance-holding time [min] | 0.7 | 1 | 2 | 3 | 4 | 5 | 7 | 9 |
| Particle diameter distribution |  |  |  |  |  |  |  |  |
| 850 μm on [wt %] | 21.4 | 16.8 | 14.9 | 11.4 | 10.5 | 11.4 | 11.8 | 9.3 |
| 850 μm pass [wt %] | 78.7 | 83.2 | 85.1 | 88.6 | 89.5 | 88.6 | 88.2 | 90.7 |
| 150 μm pass [wt %] | 3.5 | 4.0 | 3.9 | 4.0 | 4.7 | 4.8 | 4.9 | 4.7 |
| 150 μm or larger and below 850 μm [wt %] | 75.1 | 79.2 | 81.2 | 84.6 | 84.9 | 83.8 | 83.4 | 86.0 |

From the Table 2 and FIG. 3, it is noted that by setting dried substance-holding time at three minutes or longer, a ratio of particles having a particle diameter of 150 μm or larger and below 850 μm can be increased significantly. In addition, it is also noted that, even by setting dried substance-holding time at 4 minutes and 5 minutes over 3 minutes, a yield of particles with a particle diameter of 150 μm or larger and below 850 μm changed little. For the reason therefor, it is considered that the dried substance (d) is in a state of "c" in FIG. 1 at the dried substance-holding time of 3 minutes and after that, and it does not require a longer dried substance-holding time.

In addition, as compared with the dried substance (b) of Examples 1 to 7, the dried substance (d) seems to have a shorter time to become a state of "c" in FIG. 1, which is estimated as follows. In the dried substance, water content at the surface firstly decreases, and subsequently water content in side the dried substance decreases. That is, it is considered that difference of water content between at the surface and the inside of the dried substance widens firstly, but during drying, difference of water content between at the surface and the inside does not widen, and when the surface is sufficiently dried, difference of water content between at the surface and the inside becomes narrow on the contrary. It should be noted that to decrease difference in water content between at the surface and the inside, unduly long time is required for drying. Because water content of the dried substance (d) is as low as 6% by weight, and the surface of the dried substance is sufficiently dried just after drying. Further, since a water content inside the dried substance is in the midst of decreasing, the dried substance (d) is considered to have a shorter time to become a state of "c" in FIG. 1, as compared with the dried substance (b).

Production Example 3

By continuously supplying into a mixer an aqueous solution of 48.5% by weight of sodium hydroxide at a flow rate of 6.50 g/s, acrylic acid at a flow rate of 7.68 g/s, a mixed solution of an aqueous solution of 1% by weight of N,N'-methylenebisacrylamide (flow rate 0.668 g/s) and an aqueous solution of 1% by weight of diethylenetriamine pentaacetic acid trisodium salt (flow rate 0.048 g/s) at a flow rate of 0.199 g/s, and water at a flow rate of 6.27 g/s, an aqueous solution of a monomer was prepared. In this case, a temperature of the aqueous solution of a monomer was 85° C.

Into the aqueous solution of a monomer thus prepared, an aqueous solution of 1.0% by weight sodium persulfate was further added at a flow rate of 1.30 g/s, and then the aqueous solution of a monomer was continuously supplied on an endless belt running at 200 cm/m and warmed at about 100° C. The aqueous solution of a monomer continuously supplied on the belt quickly initiated polymerization, to provide a band-like hydrogel sheet (hydrogel-like polymer).

The hydrogel sheet was continuously granulated finely using a meat chopper having a screen with a diameter of 7.5 mm (manufactured by Hiraga Kosakusho Co., Ltd.), to obtain particulate hydrogel (e). In this case, a water content of the particulate hydrogel (e) was 50% by weight. In addition, particle diameter distribution of the particulate hydrogel (e) was measured by a wet-type method, to find that weight average particle diameter (D50) was 1.3 mm, ratio of gel particle having a particle diameter of 3 mm or larger was 24.2% by weight, relative to total weight of the particulate hydrogel (c), and ratio of gel particle having a particle diameter below 850 μm was 29.0% by weight, relative to total weight of the particulate hydrogel (c).

Example 13

Onto a metal screen with a length of 20 cm, a width of 14 cm, and 20 mesh, 250 g of the particulate hydrogel (e) obtained in the Production Example 3 was deposited in a thickness of about 30 mm, and dried at 180° C. for 20 minutes using a hot-air drying machine (trade name: "through-flow batch-type drying machine 71-S6 model", manufactured by Satake Chemical Equipment Mfg. Ltd.). The resultant dried substance (f) had a water content of 6% by weight, and aggregated slowly to provide a block state.

The dried substance (f) was taken out from the drying machine, stored in a container made of foamed polystyrene, and at 3 minutes after taking out from the drying machine (that is, dried substance-holding time=3 minutes), pulverized by passing one time through a roll mill (WML-type roll mill pulverization machine, manufactured by Inokuchi Giken Ltd., Co.), whose roll clearance was set at 0.3 mm, in a speed of 1 kg/m. Temperature of the dried substance to be supplied to pulverization was 91° C.

The pulverized substance (C1) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (3 minutes) and ratio (% by weight) of particles having a particle diameter of 150 μm or larger and below 850 μm of the roll mill-pulverized substance (C1) is shown in the following Table 3 and FIG. 4.

Examples 14 to 18

Roll mill-pulverized substances (B2 to B5) were obtained by performing similar operation as in Example 13, except that dried substance holding time, from taking out of the drying machine to pulverization using a roll mill, of the dried substance (f) in Example 13 was changed from 3 minutes (Example 13) to 4 minutes (Example 14), 5 minutes (Example 15), 6 minutes (Example 16), 7 minutes (Example 17), and 8 minutes (Example 18).

The pulverized substances (C2 to C6) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the resultant pulverized substances (C2 to C6) is shown in the following Table 3 and FIG. 4. A temperature of the dried substance to be subjected to pulverization was in the range of 85 to 90° C.

Comparative Examples 5 and 6

Roll mill-pulverized substances (C7 and C8) were obtained by performing similar operation as in Example 13, except that time from taking out of the drying machine to pulverization using a roll mill of the dried substance (f) in Example 13 was changed from 3 minutes (Example 8) to 1.5 minute (Comparative Example 5), and 2.5 minutes (Comparative Example 6). In pulverization of the dried substance (f) with the roll mill, the roll mill generated abnormal sound. A temperature of the dried substance to be subjected to pulverization was in the range of 92 to 94° C.

Comparative Examples 5 and 6

The pulverized substances (C7 and C8) thus obtained were classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the resultant pulverized substances (C7 and C8) is shown in the following Table 3 and FIG. 4.

Figure 4:
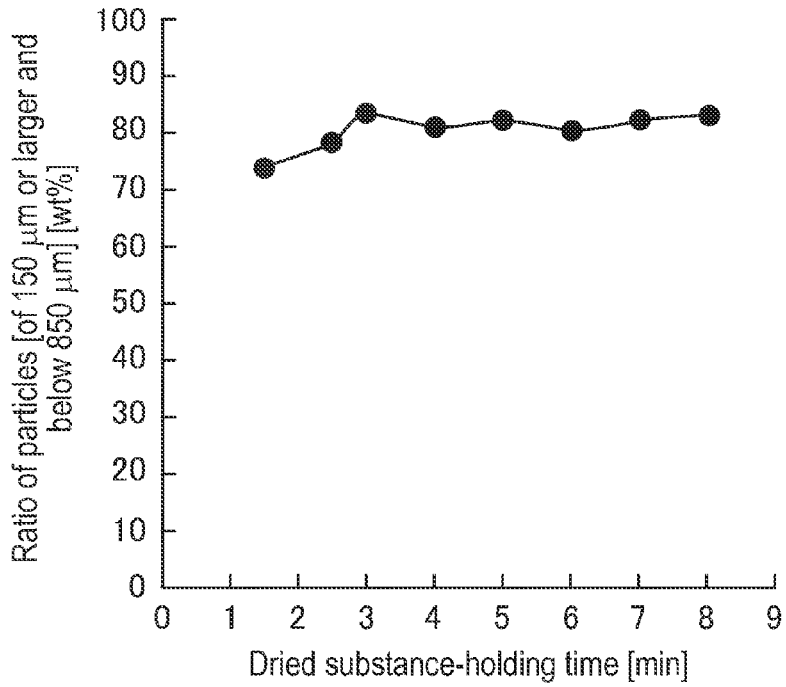
FIG. 4 is a drawing showing results of Examples 13 to 18 and Comparative Examples 5 to 6 (correlation between dried substance-holding time and ratio of particles having a particle diameter of 150 μm or larger and below 850 μm).

From the Table 3 and FIG. 4, it is noted that by setting dried substance-holding time at three minutes or longer, a ratio of particles having a particle diameter of 150 μm or larger and below 850 μm can be increased significantly. In addition, it is also noted that, even by setting dried substance-holding time at 4 minutes and 5 minutes over 3 minutes, a yield of particles with a particle diameter of 150 μm or larger and below 850 μm changed little. For the reason therefor, it is considered similarly as in summary of FIG. 3, because the dried substance (f) has a water content of as low as 6% by weight, similarly as in the dried substance (d).

Example 19

Onto a metal screen with a length of 20 cm, a width of 14 cm, and 20 mesh, 250 g of the particulate hydrogel (e) obtained in the Production Example 3 was deposited in a thickness of about 30 mm, and dried at 180° C. for 20 minutes using a hot-air drying machine (trade name: "through-flow batch-type drying machine 71-S6 model", manufactured by Satake Chemical Equipment Mfg. Ltd.). The resultant dried substance (g) had a water content of 6% by weight, and aggregated slowly to provide a block state.

Immediately after the dried substance (g) was taken out from a drying machine, aggregation was crushed and classified for two minutes using sieves each having a mesh size of 850 μm and 150 μm. In this case, particles having a particle diameter of 150 μm or larger and below 850 μm was 2.5% by weight of the whole dried substance (g), while particles having a particle diameter of below 150 μm was 0.4% by weight of the whole dried substance (g). In addition, coarse particles having a particle diameter of 850 μm or larger (On products) were transferred to a container made of foamed polystyrene and stored for 1.5 minute. At 3.5 minutes after taking out of the drying machine (that is, dried substance-holding time=3.5 minutes), coarse particles having a particle diameter of 850 μm or larger (On products) were pulverized by passing one time through a roll mill (WML-type roll mill pulverization machine, manufactured by Inokuchi Giken Ltd., Co.) whose roll clearance was set at 0.3 mm, in a speed of 1 kg/min. Temperature of the coarse particles (On products) to be subjected to pulverization was 85° C.

The pulverized substance (C9) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (3.5 minutes) and ratio (% by weight) of particles having a particle diameter of 150 μm or larger and below 850 μm of the roll mill-pulverized substance (C9) is shown in the following Table 4 and FIG. 5.

TABLE 3

|  | Comparative Example 5 | Comparative Example 6 | Example 13 | Example 14 | Example 15 | Example 16 | Example 17 | Example 18 |
| --- | --- | --- | --- | --- | --- | --- | --- | --- |
| Roll mill-pulverized substance | C7 | C8 | C1 | C2 | C3 | C4 | C5 | C6 |
| Dried substance-holding time [min] | 1.5 | 2.5 | 3 | 4 | 5 | 6 | 7 | 8 |
| Particle diameter distribution | | | | | | | | |
| 850 μm on [wt %] | 20.4 | 16.0 | 11.0 | 11.8 | 11.2 | 11.5 | 10.9 | 8.7 |
| 850 μm pass [wt %] | 79.6 | 84.0 | 89.0 | 88.2 | 88.8 | 88.5 | 89.1 | 91.4 |
| 150 μm pass [wt %] | 5.9 | 5.8 | 5.8 | 7.3 | 6.9 | 8.4 | 7.2 | 8.5 |
| 150 μm or larger and below 850 μm [wt %] | 73.7 | 78.2 | 83.2 | 80.9 | 81.9 | 80.1 | 81.9 | 82.9 |

Examples 20 to 22

Roll mill-pulverized substances (C10 to C12) were obtained by performing similar operation as in Example 19, except that dried substance holding time, from taking out of the drying machine to pulverization using a roll mill, of the dried substance (g) in Example 19 was changed from 3.5 minutes (Example 19) to 4.5 minutes (Example 20), 5.5 minutes (Example 21), and 6.5 minutes (Example 22).

The pulverized substances (C10 to C12) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the resultant pulverized substances (C10 to C12) is shown in the following Table 4 and FIG. 5. A temperature of the coarse substance (On product) to be supplied to pulverization was in the range of 83 to 85° C.

Comparative Example 7

Roll mill-pulverized substance (C13) was obtained by performing similar operation as in Example 19, except that time from taking out of the drying machine to pulverization using a roll mill of the dried substance (g) in Example 19 was changed from 3.5 minutes (Example 19) to 2.0 minute (Comparative Example 7). In pulverization of the dried substance (g) with the roll mill, the roll mill generated abnormal sound. A temperature of the dried substance to be subjected to pulverization was 85° C.

The pulverized substance (C13) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (2.0 minutes) and ratio (% by weight) of particles having a particle diameter of 150 μm or larger and below 850 μm of the resultant pulverized substances (C13) is shown in the following Table 4 and FIG. 5.

TABLE 4

| | Comparative Example 7 | Example 19 | Example 20 | Example 21 | Example 22 |
|---|---|---|---|---|---|
| Roll mill-pulverized substance | C13 | C9 | C10 | C11 | C12 |
| Dried substance-holding time [min] | 2.0 | 3.5 | 4.5 | 5.5 | 6.5 |
| Particle diameter distribution | | | | | |
| 850 μm pass [wt %] | 78.8 | 87.7 | 87.9 | 87.2 | 88.1 |
| 150 μm pass [wt %] | 5.7 | 6.6 | 7.1 | 7.0 | 8.0 |
| 150 μm or larger and below 850 μm [wt %] | 73.1 | 81.1 | 80.8 | 80.2 | 80.1 |

Figure 5:
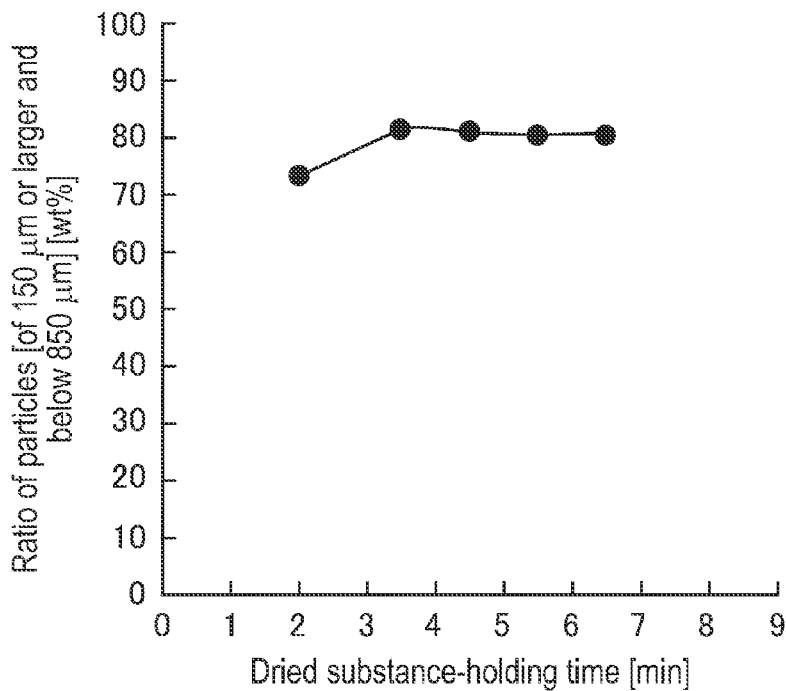
FIG. 5 is a drawing showing results of Examples 19 to 22 and Comparative Example 7 (correlation between dried substance-holding time and ratio of particles having a particle diameter of 150 μm or larger and below 850 μm).

From the Table 4 and FIG. 5, it is noted that by setting dried substance-holding time at three minutes or longer, a ratio of particles having a particle diameter of 150 μm or larger and below 850 μm can be increased significantly. In addition, in Examples 19 to 22, particles having a particle diameter of 150 μm or larger and below 850 μm, when particles having a particle diameter of 150 μm or larger and below 850 μm to be separated before pulverization (2.5% by weight of the whole dried substance) are also included, occupied 80 to 82% by weight of the whole dried substance after pulverization, demonstrating that particles having object particle diameter can be obtained in nearly the same yield as in Examples 13 to 18. In addition, as compared with Examples 13 to 18, because particles having a particle diameter of 150 μm or larger and below 850 μm and particles having a particle diameter below 150 μm have been already separated, which are not necessary to be pulverized before storage step, a content of particles to be stored in the storing step can be decreased by 2.9% by weight, relative to the whole dried substances, which can provide room for storage capability.

Production Example 4

A neutralization solution, having 13.3 g of an aqueous solution of 48.5% by weight of sodium hydroxide, 45.5 g of acrylic acid, and 19.8 g of industrial water mixed, was continuously prepared.

By continuously supplying into a mixer the neutralization solution at a flow rate of 78.6 g/s, an aqueous solution of 48.5% by weight of sodium hydroxide at a flow rate of 23.3 g/s, and 20% by weight of polyethylene glycol diacrylate (average molecular weight 523) at a flow rate of 0.232 g/s, an aqueous solution of a monomer was prepared. In this case, a temperature of the aqueous solution of a monomer was 90 to 95° C.

Into the aqueous solution of a monomer thus prepared, an aqueous solution of 46% by weight of diethylenetriamine pentaacetic acid trisodium salt (flow rate 0.0278 g/s) and an aqueous solution of 4.0% by weight sodium persulfate (flow rate 0.635 g/s) were further added. The resultant mixture was continuously supplied on an endless belt running at 7 m/minute. The aqueous solution of a monomer continuously supplied on the belt quickly initiated polymerization, to provide a band-like hydrogel sheet (hydrogel-like polymer).

The hydrogel sheet was continuously granulated finely using a cutter mill having a screen with a diameter of 12 mm (trade name: "RC250", manufactured by Yoshiko Ltd., Co.), to obtain particulate hydrogel (h) with a size of about 1 to 4 mm. In this case, a water content of the particulate hydrogel (h) was 29% by weight. In addition, particle diameter distribution of the particulate hydrogel (h) was measured by a dry-type method, to find that weight average particle diameter (D50) was 3.0 mm, ratio of gel particle having a particle diameter of 3 mm or larger was 49.1% by weight, relative to total weight of the particulate hydrogel (h), and ratio of gel particle having a particle diameter below 850 μm was 3.2% by weight, relative to total weight of the particulate hydrogel (h).

Example 23

As shown in FIG. 12, a pulverized substance was obtained by using a continuous through-circulation band drying machine equipped with a cooling chamber. That is, the particulate hydrogel (h) obtained in the Production Example 4 was subjected to through-circulation band drying for 24 minutes using the continuous through-circulation band drying machine. This drying machine is composed of two chambers having the same size; a first chamber for drying by blowing hot air of 110 to 120° C. at a linear velocity of 1.0 m/s from an upper side of a belt, and a second chamber for drying by blowing hot air of 160° C. at a linear velocity of 1.0 m/s from an upper side of a belt. A dried substance (i) obtained by this drying was cooled to a temperature of the dried substance of 87° C. by flowing air at room temperature at a velocity of 1.0 m/s for 8 minutes, by an adjacent cooling machine. A water content of the dried substance (i) sampled at the exit of the cooling machine was 10.0% by weight, and weight average particle diameter (D50) thereof was 2.9 mm. In addition, the dried substance (i) contained gel particle having a particle diameter of 3 mm or larger in an amount of 43.2% by weight, relative to total weight of the dried substance (i).

The dried substance (i) was transported using a flight conveyor and put in a sieve having a mesh size of 6 mm to continuously separate a coarse dried substance not passing through the sieve having a mesh size of 6 mm. In this case, the coarse dried substance having a particle diameter of 6 mm or larger is the one where particles of the dried substance are aggregated, and occupied 18% by weight of the whole dried substance. This coarse dried substance was quickly subjected to coarse crushing using a flush mill (manufactured by Fujipaudal Co., jp.), to obtain a coarsely crushed substance (j). Weight average particle diameter (D50) of the coarsely crushed substance (j) at this time was 2.3 mm, and particles having a particle diameter below 850 μm occupied 6.4% by weight. On the other hand, during coarse crushing of the coarse dried substance using the flush mill, a dried substance (k) which passed a sieve with a mesh size of 6 mm (weight average particle diameter (D50) thereof was 2.7 mm, and particles having a particle diameter below 850 μm occupied 3.2% by weight) was stored in a hopper X warmed with a lagging material. Further, the coarsely crushed substance (j) and the dried substance (k) were combined again and locate for 0 minute in a hopper Y having the inner wall adjusted at 80° C. The dried substance was charged to a roll mill (product name: RM-16, manufactured by Asano Ironwork Co., Ltd.), to perform pulverization at a processing speed of 250 kg/hr. Roll clearance was 0.35 mm. In addition, the dried substance using the roll mill was quickly (within 5 seconds) pulverized after being put at 80° C., and taken out from the roll mill, to obtain a roll mill-pulverized substance (D1). In this case, a temperature of the combined product of the coarsely crushed substance (j), and the dried substance (k) which passed a sieve with a mesh size of 6 mm, to be subjected to pulverization, was 80° C., measured by using a contact thermometer. Dried substance-holding time in this Example is expressed as sum of time during which the dried substance is present in a cooling machine (T1=8 minutes), time required in classification, coarse crushing, carrying (transportation) between apparatuses (T2=3 minutes), and time for holding in the hopper Y (T3=0 minute).

The pulverized substance (D1) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (11 minutes; T1+T2+T3=8 minutes+3 minute+0 minute) and ratio (% by weight) of particles having a particle diameter of 150 μm or larger and below 850 μm of the roll mill-pulverized substance (D1) is shown in the following Table 5 and FIG. 6.

Examples 24 to 26

Roll mill-pulverized substances (D2 to D4) were obtained by performing similar operation as in Example 23, except that holding time in the hopper Y (T3) in Example 23 was changed from 0 minute (Example 23) to 5 minutes (Example 24), 10 minutes (Example 25), and 15 minutes (Example 26). A temperature of a combined substance of the coarse substance (j) and the dried substance (k) which passed through the sieve with a mesh size of 6 mm, to be subjected to pulverization, was 78 to 81° C.

The pulverized substances (D2 to D4) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the roll mill-pulverized substances (D2 to D4) using a roll mill is shown in the following Table 5 and FIG. 6.

Comparative Example 8

Roll mill-pulverized substance (D5) was obtained by performing similar operation as in Example 23, except that the dried substance coming out from the drying machine was taken out and quickly pulverized (dried substance-holding time=0 minute). The roll mill generated abnormal sound in pulverization, and many flat-shaped particles crushed with the roll were observed in the pulverized substance. A temperature of the dried substance to be subjected to pulverization was 93° C.

The pulverized substance (D5) thus obtained was classified using sieves each having a mesh size of 850 μm and 150 μm, to measure a ratio (% by weight) of particulate water-absorbent resin having a particle diameter of 150 μm or larger and below 850 μm. A ratio (% by weight) of particles having a particle diameter of 150 μm or larger and below 850 μm of the roll mill-pulverized substance (D5) in dried substance-holding time (0 minute) is shown in the following Table 5 and FIG. 6.

TABLE 5

|  | Comparative Example 8 | Example 23 | Example 24 | Example 25 | Example 26 |
| --- | --- | --- | --- | --- | --- |
| Roll mill-pulverized substance | D5 | D1 | D2 | D3 | D4 |
| Dried substance-holding time [min] | 0 | 11 | 16 | 21 | 26 |
| Particle diameter distribution |  |  |  |  |  |
| 850 μm pass [wt %] | 65.5 | 87.7 | 92.5 | 91.5 | 91.7 |
| 150 μm pass [wt %] | 2.2 | 3.9 | 5.2 | 3.1 | 3.3 |
| 150 μm or larger and below 850 μm [wt %] | 63.3 | 83.8 | 87.3 | 88.4 | 88.5 |

Figure 6:
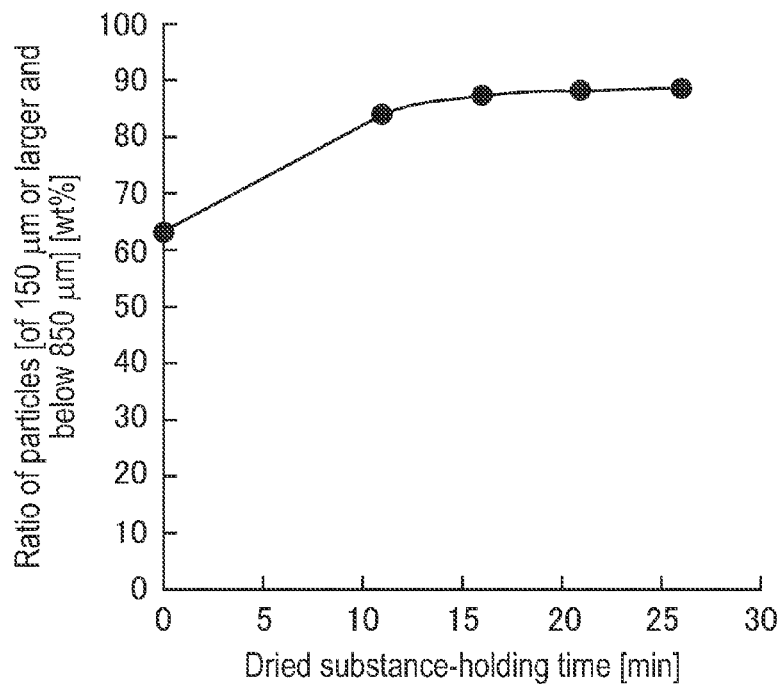
FIG. 6 is a drawing showing results of Examples 23 to 26 and Comparative Example 8 (correlation between dried substance-holding time and ratio of particles having a particle diameter of 150 μm or larger and below 850 μm).

From Table 5 and FIG. 6, it is noted that by setting dried substance-holding time at three minutes or longer, a ratio of particles having a particle diameter of 150 μm or larger and below 850 μm can be increased significantly. In addition, it is also noted that particle diameter of the pulverized substance after 10 minutes, and further after 15 minutes, became small, and a yield of particles within a preferable particle size range (150 μm or larger and below 850 μm) increased, as compared with the dried substance just after being taken out from a drying machine.

Example 27

As shown in FIG. 13, a pulverized substance was obtained by increasing dried substance-holding time only for particles with a large particle diameter. That is, a particulate hydrogel (h) obtained in the Production Example 4 was subjected to through-circulation band drying for 24 minutes using a continuous through-circulation band drying machine. The drying machine is composed of two chambers having the same size;

a first chamber for drying by blowing hot air of 110 to 120° C. at a linear velocity of 1.0 m/s from an upper side of belt, and a second chamber for drying by blowing hot air of 160° C. at a linear velocity of 1.0 m/s from an upper side of a belt. A dried substance (l) obtained by the drying was cooled to a temperature of the dried substance of 87° C. by flowing air at room temperature at a velocity of 1.0 m/s for 8 minutes, by an adjacent cooling machine. A water content of the dried substance (l) sampled at the exit of the cooling machine was 10.0% by weight, and weight average particle diameter (D50) thereof was 2.9 mm. In addition, the dried substance (l) contained a gel particle having a particle diameter of 3 mm or larger in an amount of 43.2% by weight, relative to total weight of the dried substance (l).

The dried substance (l) was transported using a flight conveyor and put in a sieve having a mesh size of 6 mm to continuously separate a coarse dried substance not passing through the sieve having a mesh size of 6 mm. In this case, the coarse dried substance having a particle diameter of 6 mm or larger is the one where particles of the dried substance are aggregated, and occupied 18% by weight of the whole dried substance. The coarse dried substance was quickly subjected to coarse crushing using a flush mill (manufactured by Fuji-paudal Co., jp.), to obtain a coarsely crushed substance (m).

The coarsely crushed substance (m) was stored for predetermined period, in a hopper Z having inner wall adjusted at 80° C. (T3m=0 minute). Further, the coarsely crushed substance (m) was combined again with the dried substance (n) just classified (which passed the hopper X (residence time being 0 minute)) and having a particle diameter below 6 mm (which passed the hopper Y (residence time being 0 minute)), and pulverized using the roll mill of Example 23, to obtain a roll mill-pulverized substance (D6). A temperature of the combined product of the coarsely crushed substance (m), and the dried substance (n) which passed a sieve with a mesh size of 6 mm, to be subjected to pulverization, was 77° C., measured by using a contact thermometer. Dried substance-holding time in this Example is expressed as sum of time during which the dried substance is present in a cooling machine (T1=8 minutes), time required in classification, coarse crushing, carrying (transportation) between apparatuses (T2=3 minutes), and time for holding in the hopper (T3=0 minute).

The pulverized substances (D6) thus obtained were classified using sieves each having a mesh size of 850 μm and 150 μm, to measure a ratio (% by weight) of particulate water-absorbent resin having a particle diameter of 150 μm or larger and below 850 μm. A relation between dried substance-holding time (T1+T2+T3m=8 minutes+3 minute+0 minute) of particles having a particle diameter of 6 mm or larger, and ratio (% by weight) of particles having a particle diameter of 150 μm or larger and below 850 μm of the roll mill-pulverized substances (D6) is shown in the following Table 6 and FIG. 7.

Examples 28 to 30

Roll mill pulverized substances (D7 to D9) were obtained by performing similar operation as in Example 27, except that holding time in the hopper Z (T3m) in Example 27 was changed from 0 minute (Example 27) to 5 minutes (Example 28), 10 minutes (Example 29), and 15 minutes (Example 30).

The pulverized substances (D7 to D9) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time (T1+T2+T3m) of the dried substance having a particle diameter of 6 mm or larger, and ratio (% by weight) of particles having a particle diameter of 150 μm or larger and below 850 μm of the roll mill-pulverized substances (D7 to D9) is shown in the following Table 6 and FIG. 7.

TABLE 6

|  | Example 27 | Example 28 | Example 29 | Example 30 |
| --- | --- | --- | --- | --- |
| Roll mill-pulverized substance | D6 | D7 | D8 | D9 |
| Dried substance-holding time [min] | 11 | 16 | 21 | 26 |
| Particle diameter distribution |  |  |  |  |
| 850 μm pass [wt %] | 76.7 | 90.7 | 89.4 | 90.7 |
| 150 μm pass [wt %] | 2.3 | 3.1 | 2.4 | 2.7 |
| 150 μm or larger and below 850 μm [wt %] | 74.4 | 87.6 | 87.0 | 88.0 |

Figure 7:
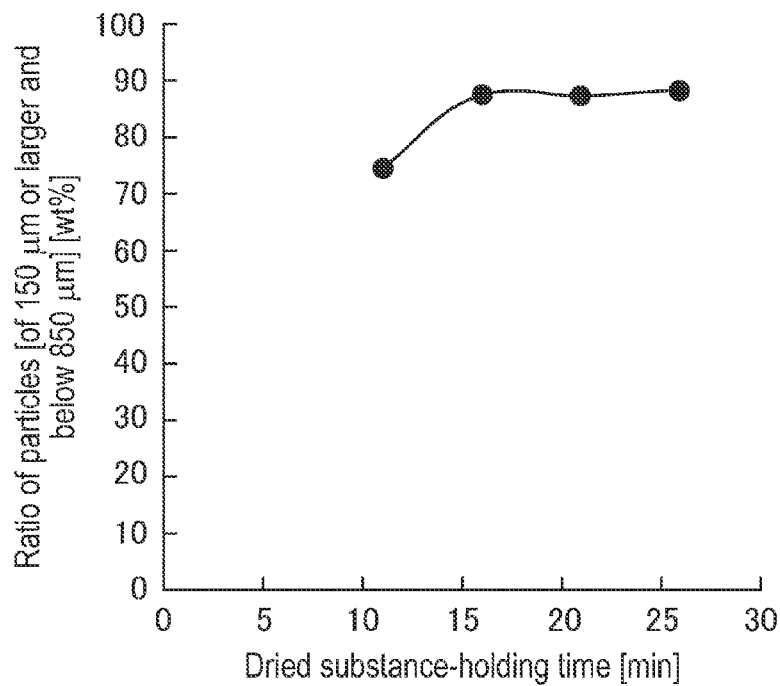
FIG. 7 is a drawing showing results of Examples 27 to 30 (correlation between dried substance-holding time and ratio of particles having a particle diameter of 150 μm or larger and below 850 μm).

From the Table 6 and FIG. 7, it is noted that by lengthening dried substance-holding time of only coarse particles occupying only 18% by weight of the whole particles, and the coarsely crushed substance thereof, a ratio (% by weight) of particles having a preferable particle size range (150 μm or larger and below 850 μm) occupying in the roll mill-pulverized substances can be increased significantly.

Example 31

As shown in FIG. 13, a pulverized substance was obtained below by increasing dried substance-holding time only for particles with large particle diameter. That is, a particulate hydrogel (h) obtained in the Production Example 4 was subjected to through-circulation band drying for 24 minutes using a continuous through-circulation band drying machine. The drying machine is composed of two chambers having the same size; a first chamber for drying by blowing hot air of 110 to 120° C. at a linear velocity of 1.0 m/s from an upper side of belt, and a second chamber for drying by blowing hot air of 160° C. at a linear velocity of 1.0 m/s from an upper side of a belt. A dried substance (o) obtained by this drying was cooled to a temperature of the dried substance of 87° C. by flowing air at room temperature at a velocity of 1.0 m/s for 8 minutes, by an adjacent cooling machine. A water content of the dried substance (o) sampled at the exit of the cooling machine was 10.0% by weight and weight average particle diameter (D50) thereof was 2.9 mm. In addition, the dried substance (o) contained gel particle having a particle diameter of 3 mm or larger in an amount of 43.2% by weight, relative to total weight of the dried substance (o).

The dried substance (o) was transported using a flight conveyor and put in a three-stage sieve having a mesh size of 6 mm, 850 μm and 150 μm to continuously separate coarse dried substances (On products) not passing through a sieve having a mesh size of 6 mm, particles (products passing through a first sieve) which passed through a sieve having a mesh size of 6 mm but did not pass through a sieve having a mesh size of 850 μm, particles (products passing through a second sieve) which passed through a sieve having a mesh size of 850 μm but did not pass through a sieve having a mesh size of 150 μm, and fine powder passing through a sieve having a mesh size of 150 μm. In this case, the coarse dried substance (On product) having a particle diameter of 6 mm or larger occupied 18% by weight of the whole dried substance, particles (products passing through a second stage) which passed through a sieve having a mesh size of 850 μm but did not pass through a sieve having a mesh size of 150 μm occupied 2.1% by weight of the whole dried substance, and fine powder passing through a sieve having a mesh size of 150 μm occupied 0.9% by weight of the whole dried substance. The coarse dried substance (On product) was quickly subjected to coarse crushing using a flush mill (manufactured by Fujipaudal Co., jp.), to obtain a coarsely crushed substance (p). Weight average particle diameter (D50) of the coarsely crushed substance (p) was 2.3 mm, and a ratio of particles having a particle diameter below 850 μm was 6.4% by weight. The coarsely crushed substance (p) was passed through a hopper Z (residence time: 0 minute). On the other hand, during coarse crushing of the coarse dried substance (On product) using the flush mill and storage thereof in a hopper Z, particles (products passing through a first stage), which passed through a sieve having a mesh size of 6 mm but did not pass through a sieve having a mesh size of 850 μm (weight average particle diameter (D50): 2.8 mm), was stored in a hopper X warmed with a lagging material. The coarsely crushed substance (p) and particles (products passing through a first stage), which passed through a sieve having a mesh size of 6 mm but did not pass through a sieve having a mesh size of 850 μm, were combined again, and the resultant dried substance was charged to a roll mill (trade name: "RM-16", manufactured by Asano Ironwork Co., Ltd.) and pulverized at a treatment speed of 250 kg/hr. Clearance of the roll was 0.35 mm. In addition, the dried substance on the roll mill was quickly pulverized (within 5 seconds) at 80° C. and taken out from the roll mill, to obtain a roll mill-pulverized substance (D10). A temperature of the combined product of the coarsely crushed substance (p) and the products passing through the first stage, to be subjected to pulverization, was measured with a contact-type thermometer, to be found to be 80° C.

Dried substance-holding time in this Example is expressed as sum of time during which the dried substance is present in a cooling machine (T1=8 minutes), time required in classification, coarse crushing, carrying (transportation) between apparatuses (T2=3 minutes), and time for holding in the hopper Z (T3=0 minute).

The pulverized substance (D10) thus obtained was classified using sieves each having a mesh size of 850 μm and 150 μm, to measure a ratio (% by weight) of particulate water-absorbent resin having a particle diameter of 150 μm or larger and below 850 μm. A relation between dried substance-holding time (11 minutes; T1+T2+T3=8 minutes+3 minutes+0 minute), and ratio (% by weight) of particles having a particle diameter of 150 μm or larger and below 850 μm of the resultant pulverized substances (D10) using a roll mill is shown in the following Table 7 and FIG. 8.

Examples 32 to 34

Roll mill-pulverized substances (D11 to D13) were obtained by performing similar operation as in Example 31, except that holding time in the hopper Z (T3) in Example 31 was changed from 0 minute (Example 31) to 5 minutes (Example 32), 10 minutes (Example 33), and 15 minutes (Example 34).

The pulverized substances (D11 to D13) thus obtained were separately classified using sieves each having a mesh size of 850 μm and 150 μm, to measure a ratio (% by weight) of particulate water-absorbent resin having a particle diameter of 150 μm or larger and below 850 μm. A relation between dried substance-holding time and ratio (% by weight) of particles having a particle diameter of 150 μm or larger and below 850 μm of the roll mill-pulverized substances (D11 to D13) is shown in the following Table 7 and FIG. 8.

TABLE 7

| | Example 31 | Example 32 | Example 33 | Example 34 |
|---|---|---|---|---|
| Roll mill-pulverized substance | D10 | D11 | D12 | D13 |
| Dried substance-holding time [min] | 11 | 16 | 21 | 26 |
| Particle diameter distribution | | | | |
| 850 μm pass [wt %] | 85.0 | 91.3 | 89.9 | 90.3 |
| 150 μm pass [wt %] | 3.1 | 3.2 | 4.5 | 3.4 |
| 150 μm or larger and below 850 μm [wt %] | 81.9 | 88.1 | 85.4 | 86.9 |

Figure 8:
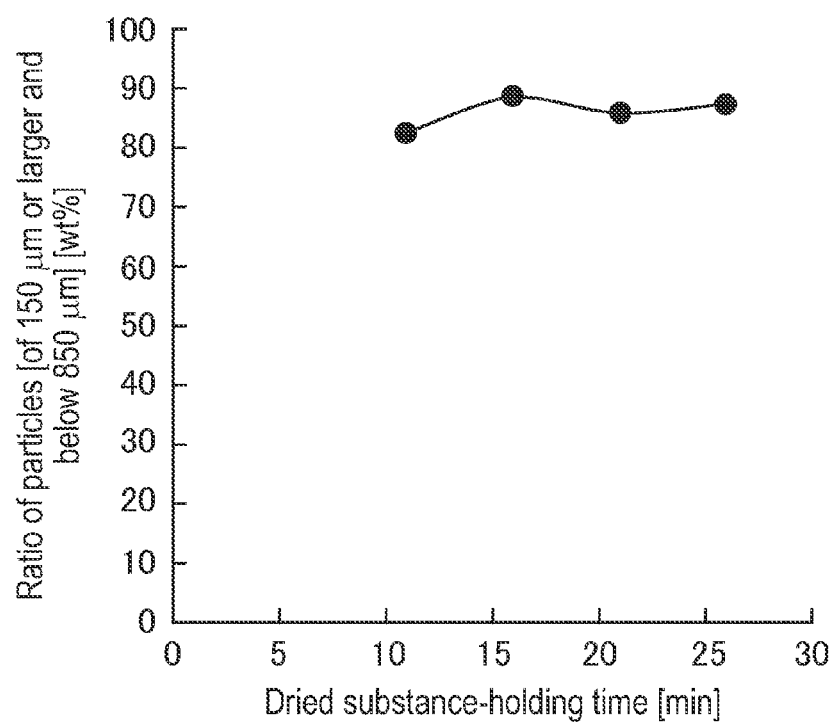
FIG. 8 is a drawing showing results of Examples 31 to 34 (correlation between dried substance-holding time and ratio of particles having a particle diameter of 150 μm or larger and below 850 μm).
Figure 9:
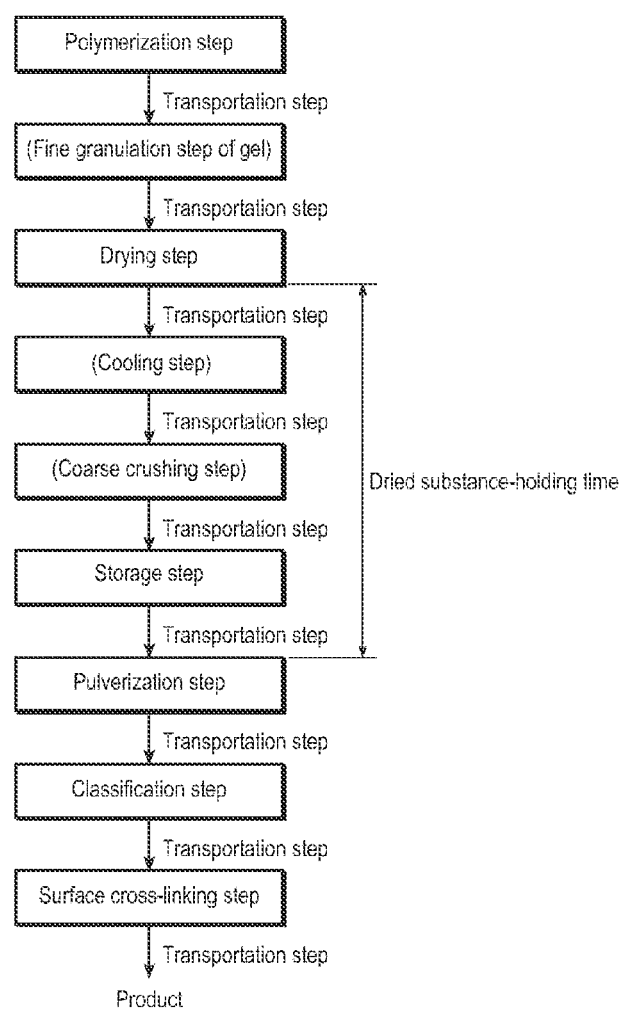
FIG. 9 is a schematic flow diagram showing a first production process relevant to an embodiment of the present invention.

From the Table 7 and FIG. 8, it is noted that particles having a particle diameter of 150 μm or larger and below 850 lam in Examples 31 to 34, when particles having a particle diameter of 150 μm or larger and below 850 μm to be separated before pulverization (2.1% by weight of the whole dried substance) are also included, occupied 82 to 89% by weight of the whole dried substance after pulverization, demonstrating that particles having object particle diameter can be obtained in nearly the same yield as in Examples 23 to 26. In addition, as compared with Examples 13 to 18, because particles having a particle diameter of 150 μm or larger and below 850 μm and particles having a particle diameter below 150 μm have been already separated, which are not necessary to be pulverized before storage step, a content of particles to be stored in the storing step can be decreased by 3.0% by weight, relative to the whole dried substances, which can provide room for storage capability.

Example 35

As for the pulverized substance (B5) obtained in Example 12 (dried substance-holding time: 9 minutes), classification and surface cross-linking were performed further as follows. That is, the pulverized substance (B5) obtained in Example 12 was classified using sieves each having a mesh size of 850 μm and 150 μm, respectively, to obtain a particulate water-absorbent resin (E1) having a particle diameter of 150 lam or larger and below 850 μm. To 100 parts by weight of the particulate water-absorbent resin (E1), a surface cross-linking agent solution, composed of 0.9 part by weight of ethylene carbonate and 2.0 parts by weight of water, was added and mixed, and further mixed for 20 minutes using a mortar mixer (manufactured by Nishinihon Shikenki Co., Ltd.) under heating in an oil bath at 205° C., to obtain a surface cross-linked particulate water-absorbent resin (F1). As for the surface cross-linked particulate water-absorbent resin (F1) thus obtained, absorbency against non-pressure (CRC), absorbency against pressure (AAP) and liquid permeability (SFC) were evaluated. As a result, for properties of the surface cross-linked particulate water-absorbent resin (F1), CRC was 27.0 [g/g], AAP was 21.9 [g/g], and SFC was 77 [×10$^{-7}$·cm$^3$·s·g$^{-1}$] The results are summarized in the following Table 8.

Comparative Example 9

Classification and surface cross-linking of the pulverized substance (B6) were performed similarly as in Example 35, except that the pulverized substance (B6) obtained in Comparative Example 2 (dried substance holding time: 0.7 minute) was used instead of the pulverized substance (B5) in Example 35, to obtain a surface cross-linked particulate water-absorbent resin (F2). As for the surface cross-linked particulate water-absorbent resin (F2) thus obtained, absorbency against non-pressure (CRC), absorbency against pressure (AAP) and liquid permeability (SFC) were evaluated. As a result, for properties of the surface cross-linked particulate water-absorbent resin (F2) obtained in the present Comparative Example, CRC was 27.2 [g/g], AAP was 21.9 [g/g], and SFC was 67 [×10$^{-7}$·cm$^3$·s·g$^{-1}$] The results are summarized in the following Table 8.

TABLE 8

|  | Example 35 | Comparative Example 9 |
|---|---|---|
| Roll mill-pulverized substance | B5 | B6 |
| Particulate water-absorbent resin | F1 | F2 |
| CRC [g/g] | 27.0 | 27.2 |
| AAP [g/g] | 21.9 | 21.9 |
| SFC [×10$^{-7}$ · cm$^3$ · s · g$^{-1}$] | 77 | 67 |

It is noted from the results of the Table 8 that as compared with the particulate water-absorbent resin (F2) of Comparative Example 9, the particulate water-absorbent resin (F1) of Example 35 is capable of enhancing liquid permeability (SFC), by setting dried substance-holding time at three minutes or longer.

INDUSTRIAL APPLICABILITY

Particle diameter of the water-absorbent resin can be controlled, and a content of fine powders can be reduced.

The present application is based on Japanese Patent Application No. 2009-084955, filed on Mar. 31, 2009, the content of which is hereby incorporated by reference in its entirety into this application.

The invention claimed is:

1. A continuous production method of a polyacrylic acid (salt)-based water-absorbent resin, comprising a polymerization step of an aqueous solution containing acrylic acid (salt), a drying step of the resultant hydrogel-like polymer, a pulverization step of the dried substance, a classification step of the pulverized substance, and optionally a surface cross-linking step of the classified substance, wherein
    (a) the drying step and the pulverization step are connected via a storage step and a transportation step;
    (b) a time of holding the dried substance from a time of completing the drying step to a time of starting the pulverization step is set at 3 minutes or longer;
    (c) prior to the pulverization step, a classification step of the dried substance is further performed, and different times of holding the dried substance are applied based on the particle diameters of the dried substance classified, in which, prior to pulverization, at least 50% by weight of the dried substance is composed of particles each having a particle diameter of 850 μm or larger, and a time of holding the dried particles each having a particle diameter of 850 μm or larger is 3 minutes or longer; and
    (d) in the storage step, the dried substance after the drying step is stored while being heated at 40 to 90° C.

2. The production method according to claim 1, wherein after the drying step, a step for cooling the dried substance is performed.

3. The production method according to claim 1, wherein after the drying step, a coarse crushing step of the dried substance aggregated is performed.

4. The production method according to claim 1, wherein water content of the dried substance is 3 to 15% by weight.

5. The production method according to claim 1, wherein temperature of the dried substance to be supplied to the pulverization step is 40 to 100° C.

6. The production method according to claim 1, wherein the drying step is performed at 120 to 200° C.

7. The production method according to claim 1, wherein ratio of particles which are the particulate water-absorbent resin obtained via the pulverization step of the dried substance and the classification step of the pulverized substance and have a particle diameter of 150 μm or larger and below 850 μm is 80 to 99% by weight.

8. The production method according to claim 1, further comprising a step for removing fine powder at the classification step of the pulverized substance and recycling the fine powder removed.

9. The production method according to claim 1, wherein the polymerization step is performed by continuous kneader polymerization or continuous belt polymerization.

10. The production method according to claim 1, wherein the drying step is performed by through-circulation band drying.

11. The production method according to claim 1, wherein 80% by weight or more of the pulverized substance is a particle with a particle diameter of below 850 μm.

12. The production method according to claim 1, wherein the pulverization is performed using a roll mill or a roll granulator.

13. The production method according to claim 1, wherein the transportation step is performed using pneumatic transportation or a conveyor.

14. The production method according to claim 1, wherein the pulverization of the water-absorbent resin is performed at a scale of 1 t/hr or larger per line.

15. The production method according to claim 1, wherein at least a part of the storage step and a part of the transportation step are performed under reduced pressure, wherein the degree of depressurization is over 0 kPa and not greater than 10 kPa.

16. The production method according to claim 1, wherein 50% or more of the duration from the time of completing the drying step to the time of starting the pulverization step is set under reduced pressure.

* * * * *